United States Patent
Venugopal et al.

(10) Patent No.: US 12,375,159 B2
(45) Date of Patent: Jul. 29, 2025

(54) MEASUREMENT REPORTING FOR MULTI-PORT RECEIVE BEAMS

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(*) Notice: Subject to any disclaimer, the term of this patent is extended or adjusted under 35 U.S.C. 154(b) by 812 days.

(21) Appl. No.: 17/468,458

(22) Filed: Sep. 7, 2021

(65) Prior Publication Data
US 2022/0077916 A1 Mar. 10, 2022

Related U.S. Application Data

(60) Provisional application No. 63/076,288, filed on Sep. 9, 2020.

(51) Int. Cl.
*H04B 7/08* (2006.01)
*H04B 7/06* (2006.01)
*H04W 24/10* (2009.01)

(52) U.S. Cl.
CPC ........... *H04B 7/088* (2013.01); *H04B 7/0626* (2013.01); *H04B 7/0639* (2013.01); *H04B 7/0695* (2013.01); *H04W 24/10* (2013.01)

(58) Field of Classification Search
CPC .... H04B 7/088; H04B 7/0626; H04B 7/0639; H04B 7/0695; H04W 24/10
See application file for complete search history.

(56) References Cited

U.S. PATENT DOCUMENTS

| | | | |
|---|---|---|---|
| 2019/0349784 A1* | 11/2019 | Tang | H04L 41/08 |
| 2020/0077285 A1* | 3/2020 | Yu | H04W 72/12 |
| 2023/0026501 A1* | 1/2023 | Li | H04B 7/0695 |

\* cited by examiner

*Primary Examiner* — Mohammad S Adhami

(57) ABSTRACT

Methods, systems, and devices for wireless communications are described. A user equipment (UE) may receive a control message triggering the UE to perform an iterative joint beam pair selection procedure for selecting a receive beam and a transmission beam. In some cases, the UE may additionally receive control signaling from the base station configuring the UE to generate a measurement report associated with the receive beam (e.g., that is associated with a first and second port of the UE). The UE may then receive a reference signal via the receive beam. Based on receiving the reference signal, the UE may transmit the measurement report to the base station, where the measurement report indicates at least one measurement, a first resource index corresponding to the first port of the UE, and a second resource index corresponding to the second port of the UE.

30 Claims, 16 Drawing Sheets

MEASUREMENT REPORTING FOR MULTI-PORT RECEIVE BEAMS

CROSS REFERENCE

The present Application for Patent claims the benefit of U.S. Provisional Patent Application No. 63/076,288 by VENUGOPAL et al., entitled "MEASUREMENT REPORTING FOR MULTI-PORT RECEIVE BEAMS," filed Sep. 9, 2020, assigned to the assignee hereof, and expressly incorporated by reference herein.

FIELD OF TECHNOLOGY

The following relates to wireless communications, including measurement reporting for multi-port receive beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station and a UE may communicate using one or more directional beams. That is, the base station may transmit downlink transmissions by a transmission beam while the UE may receive the downlink transmissions by a receive beam. In some cases, the base station and UE may perform a beam sweeping procedure to select a transmission and receive beam pair associated with more reliable communications than other transmission and receive beam pairs. The UE may additionally report one or more measurements associated with a beam pair to maintain a reliable communication link between the UE and the base station.

SUMMARY

The described techniques relate to improved methods, systems, devices, and apparatuses that support measurement reporting for multi-port receive beams. Generally, the described techniques provide for improving a reliability of communications between a base station and a user equipment (UE). The base station and UE may communicate using a beam pair including a transmission beam used by the base station and a receive beam used by the UE. In order to select the beam pair associated with a higher reliability (e.g., when compared to a different beam pair), the base station and UE may perform an iterative joint beam pair selection procedure. During the iterative joint beam pair selection procedure, the base station may transmit a reference signal by a first beam while the UE attempts to receive the reference signal by each beam from a set of receive beams. The UE and base station may iterate this procedure for additional transmission beams, thus identifying a beam pair (e.g., a transmission beam and a receive beam) that is associated with the higher reliability. In some cases, the identified receive beam may be associated with more than one port at the UE. That is, the UE may receive communications via the receive beam using at least a first port at the UE and a second port at the UE that is different from the first port.

After the base station and UE identify a beam pair, the UE may transmit a measurement report indicating at least one measurement associated with the receive beam. For example, the base station may transmit control signaling to the UE configuring the UE to generate the measurement report. The base station may then transmit a reference signal and the UE may receive the reference signal via the receive beam at each of the first port and the second port. The UE may generate the measurement report based on the control signaling and may include an indication of a first resource index corresponding to the first port of the UE and a second resource index corresponding to the second port of the UE. The UE may additionally include at least one measurement within the measurement report. For example, the UE may indicate a measurement (e.g., a signal-to-interference-plus-noise ratio (SINR), a reference signal receive power (RSRP)) for a portion of the reference signal that is received via each port of the UE. In another example, the UE may indicate a single joint-measurement that is based on the portions of the reference signal that are received by each of the ports of the UE. That is, the UE may indicate a capacity metric or mutual information metric for the first and second ports of the UE.

A method of wireless communication at a UE is described. The method may include receiving, from a base station, control signaling configuring the UE to generate a measurement report associated with a receive beam at a first port of the UE and a second port of the UE, receiving a reference signal via the receive beam at each of the first port and the second port, and transmitting, to the base station, the measurement report indicating at least one measurement, a first resource index corresponding to the first port of the UE, and a second resource index corresponding to the second port of the UE based on the control signaling.

An apparatus for wireless communication at a UE is described. The apparatus may include a processor, memory coupled with the processor, and instructions stored in the memory. The instructions may be executable by the processor to cause the apparatus to receive, from a base station, control signaling configuring the UE to generate a measurement report associated with a receive beam at a first port of the UE and a second port of the UE, receive a reference signal via the receive beam at each of the first port and the second port, and transmit, to the base station, the measurement report indicating at least one measurement, a first resource index corresponding to the first port of the UE, and a second resource index corresponding to the second port of the UE based on the control signaling.

Another apparatus for wireless communication at a UE is described. The apparatus may include means for receiving, from a base station, control signaling configuring the UE to generate a measurement report associated with a receive beam at a first port of the UE and a second port of the UE, receiving a reference signal via the receive beam at each of the first port and the second port, and transmitting, to the base station, the measurement report indicating at least one measurement, a first resource index corresponding to the first port of the UE, and a second resource index corresponding to the second port of the UE based on the control signaling.

A non-transitory computer-readable medium storing code for wireless communication at a UE is described. The code may include instructions executable by a processor to receive, from a base station, control signaling configuring the UE to generate a measurement report associated with a receive beam at a first port of the UE and a second port of the UE, receive a reference signal via the receive beam at each of the first port and the second port, and transmit, to the base station, the measurement report indicating at least one measurement, a first resource index corresponding to the first port of the UE, and a second resource index corresponding to the second port of the UE based on the control signaling.

In some examples of the method, apparatuses, and non-transitory computer-readable medium described herein, transmitting the measurement report may include operations, features, means, or instructions for transmitting at least one measurement including a first measurement and a second measurement in the measurement report in a defined order to indicate that the first measurement may be associated with one of the first port or the second port and that the second measurement may be associated with the other of the first port or the second port.

Some examples of the method, apparatuses, and non-transitory computer-readable medium described herein may further include operations, features, means, or instructions for receiving a downlink transmission via a joint transmission beam generated based on a first transmission beam corresponding to the first resource index and a second transmission beam corresponding to the second resource index.

In some examples of the method, apparatuses, and non-transitory computer-readable medium described herein, transmitting the measurement report may include operations, features, means, or instructions for transmitting the measurement report indicating the at least one measurement that may be a first capacity metric or a first mutual information metric for the first port and the second port.

Some examples of the method, apparatuses, and non-transitory computer-readable medium described herein may further include operations, features, means, or instructions for receiving a control message that triggers the UE to perform an iterative joint beam pair selection procedure and indicates a first resource set of repeating resources for selecting the receive beam from a set of different receive beams and a second resource set of repeating resources for selecting a transmission beam from a set of different transmission beams.

In some examples of the method, apparatuses, and non-transitory computer-readable medium described herein, the first resource set of repeating resources include a first set of channel measurement resources and a first set of interference measurement resources, and the second resource set of repeating resources includes a second set of channel measurement resources that differs from the first set of channel measurement resources and a second set of interference measurement resources that differs from the first set of interference measurement resources.

In some examples of the method, apparatuses, and non-transitory computer-readable medium described herein, performing the iterative joint beam pair selection procedure may include operations, features, means, or instructions for selecting the transmission beam from the set of different transmission beams based on monitoring the first set of channel measurement resources and the first set of interference measurement resources, and selecting the receive beam from the set of different receive beams based on receiving a second reference signal over the set of receive beams via the second set of channel measurement resources and the second set of interference measurement resources.

Some examples of the method, apparatuses, and non-transitory computer-readable medium described herein may further include operations, features, means, or instructions for transmitting a beam selection report indicating the transmission beam, the receive beam, or both, selected using the iterative joint beam pair selection procedure.

Some examples of the method, apparatuses, and non-transitory computer-readable medium described herein may further include operations, features, means, or instructions for monitoring, during the iterative joint beam pair selection procedure, for a first reference signal in each resource over one or more iterations of the first resource set of repeating resources to select the receive beam, and transmitting, during the iterative joint beam pair selection procedure, a second reference signal in each resource over one or more iterations of the second resource set.

In some examples of the method, apparatuses, and non-transitory computer-readable medium described herein, each iteration of the first resource set at least partially overlaps in time with each iteration of the second resource set.

In some examples of the method, apparatuses, and non-transitory computer-readable medium described herein, transmitting the measurement report may include operations, features, means, or instructions for transmitting at least one measurement including a first measurement that may be a first reporting quantity type measured at the first port of the UE and a second measurement that may be the first reporting quantity type or a second reporting quantity type measured at the second port of the UE.

In some examples of the method, apparatuses, and non-transitory computer-readable medium described herein, transmitting the measurement report may include operations, features, means, or instructions for transmitting the measurement report indicating the first resource index that may be a first channel state information reference signal resource index (CRI), and the second resource index that may be a second CRI.

In some examples of the method, apparatuses, and non-transitory computer-readable medium described herein, the at least one measurement may include operations, features, means, or instructions for measuring the reference signal at the first port to generate the first measurement, and measuring the reference signal at the second port to generate the second measurement.

In some examples of the method, apparatuses, and non-transitory computer-readable medium described herein, transmitting the measurement report may include operations, features, means, or instructions for transmitting at least one measurement including a first measurement and a second measurement in the measurement report, the measurement report indicating the first measurement and the second measurement that each may be one or more of a signal-to-interference-plus-noise ratio of the reference signal or a receive power of the reference signal.

In some examples of the method, apparatuses, and non-transitory computer-readable medium described herein, receiving the reference signal may include operations, features, means, or instructions for receiving the reference signal that may be a channel state information reference signal.

In some examples of the method, apparatuses, and non-transitory computer-readable medium described herein, receiving the control signaling may include operations, features, means, or instructions for receiving radio resource control signaling indicating to generate the measurement report.

In some examples of the method, apparatuses, and non-transitory computer-readable medium described herein, receiving the control signaling may include operations, features, means, or instructions for receiving the control signaling indicating a set of reference signal resources, where the reference signal may be received via the set of reference signal resources at the first port and the second port.

In some examples of the method, apparatuses, and non-transitory computer-readable medium described herein, transmitting the measurement report may include operations, features, means, or instructions for transmitting the measurement report indicating the first resource index corresponding to a first reference signal resource of the set of reference signal resources and the second resource index corresponding to a second reference signal resource of the set of reference signal resources.

A method of wireless communication at a base station is described. The method may include transmitting, to a UE, control signaling indicating to generate a measurement report associated with a receive beam at a first port of the UE and a second port of the UE, transmitting a reference signal based on the control signaling, and receiving, from the UE, the measurement report indicating at least one measurement, a first resource index corresponding to the first port of the UE, and a second resource index corresponding to the second port of the UE.

An apparatus for wireless communication at a base station is described. The apparatus may include a processor, memory coupled with the processor, and instructions stored in the memory. The instructions may be executable by the processor to cause the apparatus to transmit, to a UE, control signaling indicating to generate a measurement report associated with a receive beam at a first port of the UE and a second port of the UE, transmit a reference signal based on the control signaling, and receive, from the UE, the measurement report indicating at least one measurement, a first resource index corresponding to the first port of the UE, and a second resource index corresponding to the second port of the UE.

Another apparatus for wireless communication at a base station is described. The apparatus may include means for transmitting, to a UE, control signaling indicating to generate a measurement report associated with a receive beam at a first port of the UE and a second port of the UE, transmitting a reference signal based on the control signaling, and receiving, from the UE, the measurement report indicating at least one measurement, a first resource index corresponding to the first port of the UE, and a second resource index corresponding to the second port of the UE.

A non-transitory computer-readable medium storing code for wireless communication at a base station is described. The code may include instructions executable by a processor to transmit, to a UE, control signaling indicating to generate a measurement report associated with a receive beam at a first port of the UE and a second port of the UE, transmit a reference signal based on the control signaling, and receive, from the UE, the measurement report indicating at least one measurement, a first resource index corresponding to the first port of the UE, and a second resource index corresponding to the second port of the UE.

In some examples of the method, apparatuses, and non-transitory computer-readable medium described herein, receiving the measurement report may include operations, features, means, or instructions for receiving at least one measurement including a first measurement and a second measurement in the measurement report in a defined order to indicate that the first measurement may be associated with one of the first port or the second port and that the second measurement may be associated with the other of the first port or the second port.

Some examples of the method, apparatuses, and non-transitory computer-readable medium described herein may further include operations, features, means, or instructions for transmitting a downlink transmission via a joint transmission beam generated based on a first transmission beam corresponding to the first resource index and a second transmission beam corresponding to the second resource index.

In some examples of the method, apparatuses, and non-transitory computer-readable medium described herein, receiving the measurement report may include operations, features, means, or instructions for receiving the measurement report indicating the at least one measurement that may be a first capacity metric or a first mutual information metric for the first port and the second port.

Some examples of the method, apparatuses, and non-transitory computer-readable medium described herein may further include operations, features, means, or instructions for transmitting a control message that triggers the UE to perform an iterative joint beam pair selection procedure with the base station and indicates a first resource set of repeating resources for selecting the receive beam from a set of different receive beams and a second resource set of repeating resources for selecting a transmission beam from a set of different transmission beams.

In some examples of the method, apparatuses, and non-transitory computer-readable medium described herein, the first resource set of repeating resources include a first set of channel measurement resources and a first set of interference measurement resources, and the second resource set of repeating resources includes a second set of channel measurement resources that differs from the first set of channel measurement resources and a second set of interference measurement resources that differs from the first set of interference measurement resources.

Some examples of the method, apparatuses, and non-transitory computer-readable medium described herein may further include operations, features, means, or instructions for receiving a beam selection report indicating the transmission beam, the receive beam, or both, selected by the UE using the iterative joint beam pair selection procedure.

Some examples of the method, apparatuses, and non-transitory computer-readable medium described herein may further include operations, features, means, or instructions for transmitting, during the iterative joint beam pair selection procedure, a first reference signal in each resource over one or more iterations of the first resource set of repeating resources, and receiving, during the iterative joint beam pair selection procedure, a second reference signal in each resource over one or more iterations of the second resource set.

In some examples of the method, apparatuses, and non-transitory computer-readable medium described herein, each iteration of the first resource set at least partially overlaps in time with each iteration of the second resource set.

In some examples of the method, apparatuses, and non-transitory computer-readable medium described herein, receiving the measurement report may include operations, features, means, or instructions for receiving at least one measurement including a first measurement that may be a first reporting quantity type measured at the first port of the UE and a second measurement that may be the first reporting quantity type or a second reporting quantity type measured at the second port of the UE.

In some examples of the method, apparatuses, and non-transitory computer-readable medium described herein, receiving the measurement report may include operations, features, means, or instructions for receiving the measurement report indicating the first resource index that may be a first CRI, and the second resource index that may be a second CRI.

In some examples of the method, apparatuses, and non-transitory computer-readable medium described herein, receiving the measurement report may include operations, features, means, or instructions for receiving at least one measurement including a first measurement and a second measurement in the measurement report, the measurement report indicating the first measurement and the second measurement that each may be one or more of an SINR of the reference signal or a receive power of the reference signal.

In some examples of the method, apparatuses, and non-transitory computer-readable medium described herein, transmitting the reference signal may include operations, features, means, or instructions for transmitting the reference signal that may be a channel state information reference signal.

In some examples of the method, apparatuses, and non-transitory computer-readable medium described herein, transmitting the control signaling may include operations, features, means, or instructions for transmitting radio resource control signaling indicating to generate the measurement report.

In some examples of the method, apparatuses, and non-transitory computer-readable medium described herein, transmitting the control signaling may include operations, features, means, or instructions for transmitting the control signaling indicating a set of reference signal resources, where the reference signal may be transmitted via the set of reference signal resources at the first port and the second port.

In some examples of the method, apparatuses, and non-transitory computer-readable medium described herein, receiving the measurement report may include operations, features, means, or instructions for receiving the measurement report indicating the first resource index corresponding to a first reference signal resource of the set of reference signal resources and the second resource index corresponding to a second reference signal resource of the set of reference signal resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
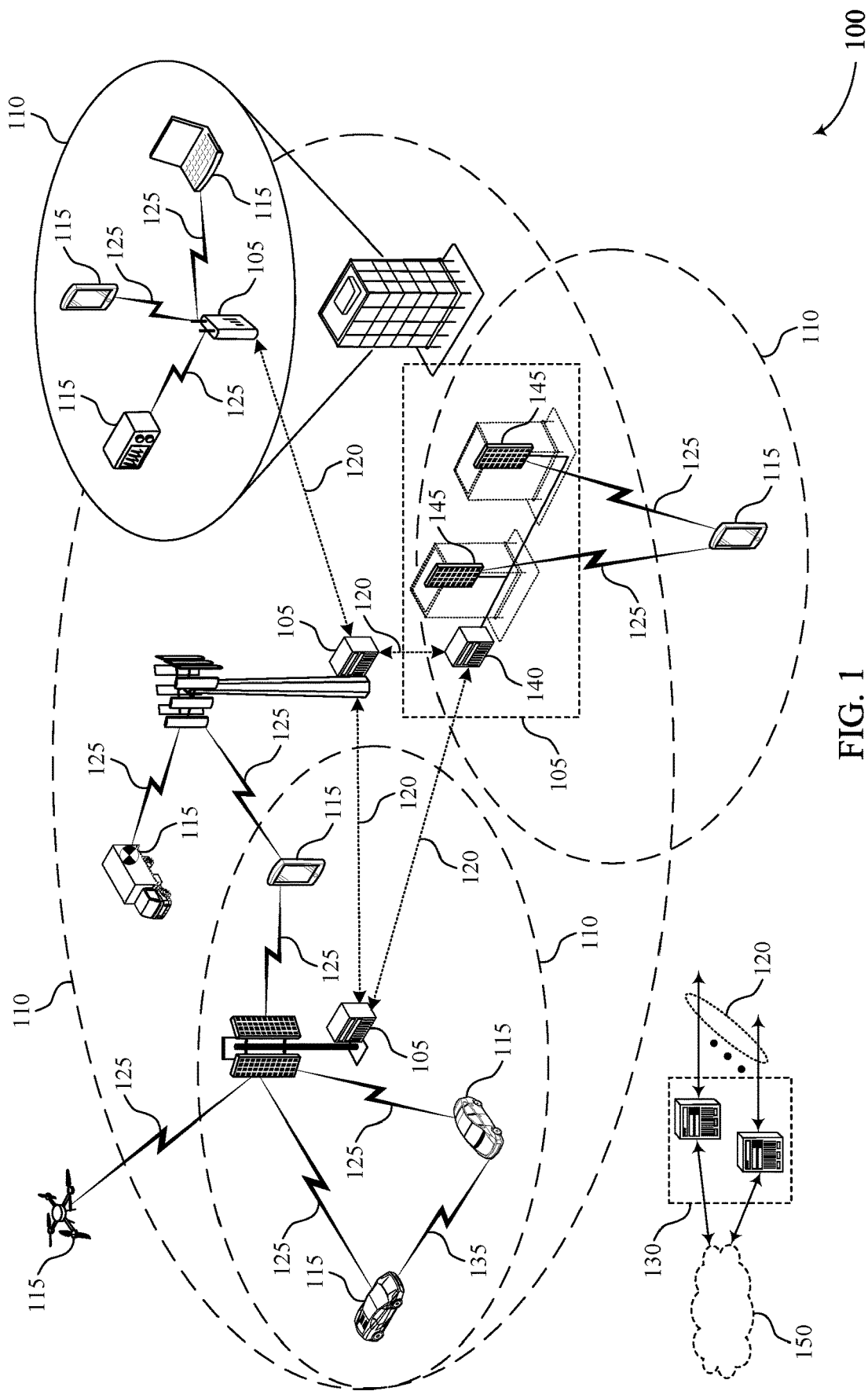
FIG. 1 illustrates an example of a system for wireless communications that supports measurement reporting for multi-port receive beams in accordance with aspects of the present disclosure.

In some wireless communications systems, a user equipment (UE) may receive reference signals for a base station as part of a joint beam pair selection procedure to identify a reliable transmission beam and receive beam pair for communications between the UE and base station. For example, in a first portion of the joint beam pair selection procedure (e.g., during the P2 process of the joint beam pair selection procedure), the base station may transmit reference signals via a set of transmission beams and the UE may receive each of the reference signals by a single receive beam and provide measurement reports to the base station associated with each of the transmission beams. The base station may then identify which transmission beam is associated with a highest signal quality. During a second portion of the joint beam pair selection procedure (e.g., during the P3 process of the joint beam pair selection procedure) of the joint beam pair selection procedure, the base station may transmit reference signals by the beam associated with the highest signal quality while the UE performs a receive joint beam pair selection procedure to identify the receive beam associated with a highest signal quality. Thus, the base station and UE may identify a beam pair (e.g., a transmit beam and a receive beam pair) associated with a high signal quality.

In some cases, this process may not result in selecting a beam pair associated with a highest signal quality. For example, because the base station selects a transmit beam prior to identifying how the signal quality is affected by different receive beams, the identified beam pair may not be associated with a highest signal quality possible for the UE and base station. Additionally, in some cases a receive beam used by the UE may be associated with multiple ports at the UE (e.g., two ports). That is, the UE may provide a measurement report associated with that reference signal based on an average measurement (e.g., a linear average) associated with each of the multiple ports. In some cases, the average measurement associated with multiple ports may not indicate an actual performance provided by the receive beam due to the averaging.

Generally, the described techniques provide for improving a reliability of communications between a base station and a UE. The base station and UE may communicate using a beam pair including a transmission beam used by the base station and a receive beam used by the UE. In order to select the beam pair associated with a higher reliability (e.g., when compared to a different beam pair), the base station and UE may perform an iterative joint beam pair selection procedure. During the iterative joint beam pair selection procedure, the base station may transmit a reference signal by a first beam while the UE attempts to receive the reference signal by each beam from a set of receive beams. The UE and base station may iterate this procedure for additional transmission beams, thus identifying a beam pair (e.g., a transmission beam and a receive beam) that is associated with the higher reliability. In some cases, the identified receive beam may be associated with more than one port at the UE. That is, the UE may receive communications via the receive beam using at least a first port at the UE and a second port at the UE that is different from the first port.

After the base station and UE identify a beam pair, the UE may transmit a measurement report indicating at least one measurement associated with the receive beam. For example, the base station may transmit control signaling to the UE configuring the UE to generate the measurement report. The base station may then transmit a reference signal and the UE may receive the reference signal via the receive beam at each of the first port and the second port. The UE may generate the measurement report based on the control signaling and may include an indication of a first resource index corresponding to the first port of the UE and a second resource index corresponding to the second port of the UE. The UE may additionally include at least one measurement within the measurement report. For example, the UE may indicate a measurement (e.g., a signal-to-interference-plus-noise ratio (SINR), a reference signal receive power (RSRP)) for a portion of the reference signal that is received via each port of the UE. In another example, the UE may indicate a single joint-measurement that is based on the portions of the reference signal that are received by each of the ports of the UE. That is, the UE may indicate a capacity metric or mutual information metric for the first and second ports of the UE.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to measurement reporting for multi-port receive beams.

FIG. 1 illustrates an example of a wireless communications system 100 that supports measurement reporting for multi-port receive beams in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations (e.g., during a joint beam pair selection procedure). For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions (e.g., multiple transmission beams), and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements (e.g., ports) of an antenna array, or by processing received signals according to different receive beamforming weight sets applied to signals received at multiple antenna elements of an antenna array, any of which may be referred to as "listening" according to different receive configurations or receive directions. In some cases, each of the receiving directions may be associated with a receive beam. In some examples, a receiving device may use a single receive configuration to receive along a single beam direction (e.g., when receiving a data signal via a receive beam). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

To select a beam pair (e.g., a transmission beam and a receive beam) for communications between a UE 115 and base station 105, the UE 115 and base station 105 may perform an iterative joint beam pair selection. One iteration of the joint beam selection procedure may include the base station 105 may transmit a reference signal by a first beam while the UE 115 attempts to receive the reference signal by each beam from a set of receive beams. In another example, one iteration of the joint beam selection procedure may include the base station 105 transmitting a reference signal by a set of transmission beams while the UE 115 attempts to receive the reference signal by a single receive beam. The UE 115 and base station 105 may iterate this procedure (e.g., by switching transmission and/or receive beams) to identify a beam pair that is associated with a highest reliability (e.g., based on having a highest signal quality, a lowest interference value, a highest capacity, or any combination thereof) from each of the possible beam pairs. In some cases, the identified receive beam may be associated with more than one port at the UE 115. That is, the UE 115 may receive communications via the receive beam using at least a first port at the UE 115 and a second port at the UE 115 that is different from the first port.

After the base station 105 and UE 115 identify a beam pair, the UE 115 may transmit a measurement report indicating at least one measurement associated with the receive beam. For example, the base station 105 may transmit control signaling to the UE 115 configuring the UE 115 to generate the measurement report. The base station 105 may then transmit a reference signal and the UE 115 may receive the reference signal via the receive beam at each of the first port and the second port. The UE 115 may generate the measurement report based on the control signaling and may include an indication of a first resource index corresponding to the first port of the UE 115 and a second resource index corresponding to the second port of the UE 115. The UE 115 may additionally include at least one measurement within the measurement report. For example, the UE 115 may indicate a measurement (e.g., an SINR, an RSRP) for a portion of the reference signal that is received via each port of the UE 115. In another example, the UE 115 may indicate a single joint-measurement that is based on the portions of the reference signal that are received by each of the ports of the UE 115. That is, the UE 115 may indicate a capacity metric or mutual information metric for the first and second ports of the UE 115.

Figure 2:
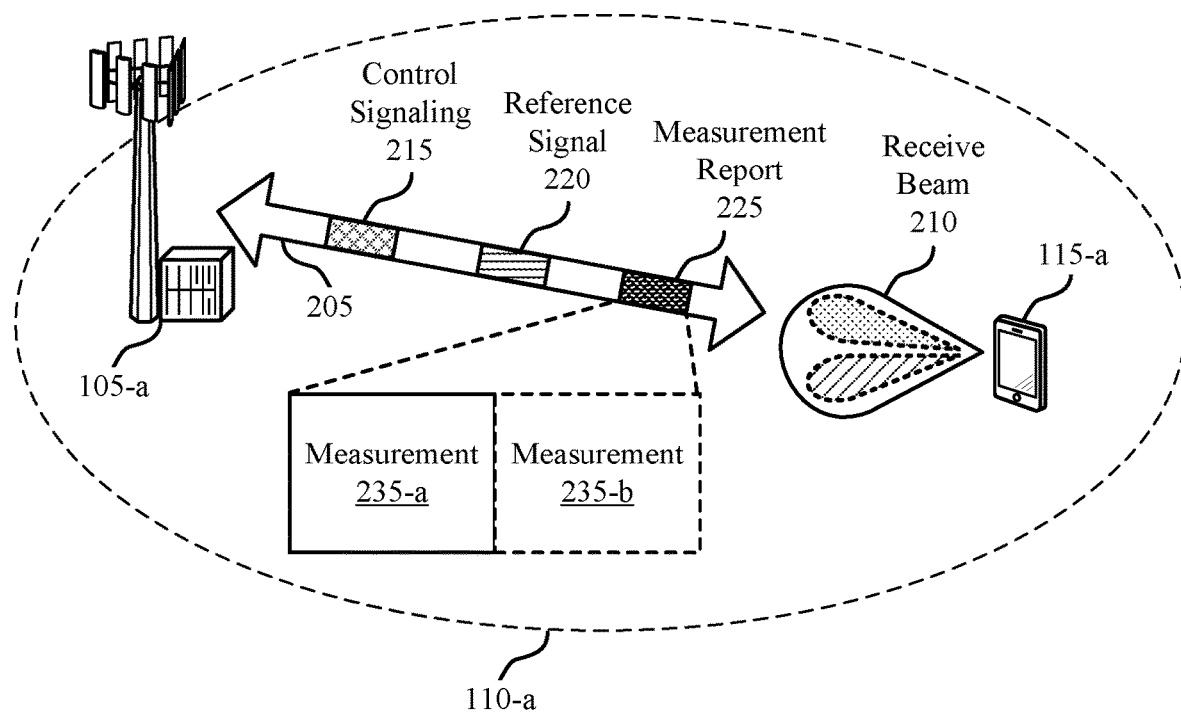
FIG. 2 illustrates an example of a wireless communications system that supports measurement reporting for multi-port receive beams in accordance with aspects of the present disclosure.

FIG. 2 illustrates an example of a wireless communications system 200 that supports measurement reporting for multi-port receive beams in accordance with aspects of the present disclosure. In some examples, the wireless communications system 200 may implement aspects of wireless communications system 100. For example, the wireless communications system 200 may include base station 105-a, UE 115-a, and geographic coverage area 110-a, which may be examples of a base station 105, a UE 115, and a geographic coverage area 110, respectively, as described with reference to FIG. 1.

The UE 115-a may be in communication with the base station 105-a via the communication link 205. In some cases, the communication link 205 may correspond to a beam pair. That is, the base station 105-a may utilize a first directional beam (e.g., a transmission beam) to communicate via the communication link 205 and the UE 115-a may utilize a second directional beam (e.g., a receive beam 210) to communicate via the communication link 205. In some cases, the receive beam 210 may be associated with multiple ports 230 of the UE 115-a. That is, the UE 115-a may utilize a first port 230-a and a second port 230-b to receive signals via the receive beam 210. In the example of wireless communications system 200, the receive beam 210 is associated with two ports 230 of the UE 115-a, but in other examples the receive beam 210 may be associated with more than two ports 230 (e.g., three ports, four ports).

The base station 105-a may transmit control signaling 215 to the UE 115-a via the communication link 205. For example, the base station 105-a may transmit radio resource control (RRC) signaling to the UE 115-a. The control signaling 215 may configure the UE 115-a to generate a measurement report 225 associated with the receive beam 210. In some cases, the control signaling 215 may indicate, to the UE 115-a, a set of resources for receiving a reference signal 220 (e.g., a channel state information-reference signal (CSI-RS) from the base station 105-a. For example, the control signaling 215 may include one or more resource indices indicating the set of resources that the UE 115-a should monitor to receive the reference signal 220. In an example where the reference signal 220 is a CSI-RS, the one or more resource indices may be channel state information reference signal resource indices (CRIs).

In some cases, the set of resources for receiving the reference signal 220 may include a first subset of resources associated with the first port 230-a of the UE 115-a and a second subset of resources associated with a second port 230-b of the UE 115-a. That is, the UE 115-a may be configured to receive a first portion of the reference signal 220 via the first subset of resources using the first port 230-a of the UE 115-a. Additionally, the UE 115-a may be configured to receive a second portion of the reference signal 220 via the second subset of resources using the second port 230-b of the UE 115-a. In some cases, the first subset of resources may be associated with a first resource index (e.g., a first CRI) and the second subset of resources may be associated with a second resource index (e.g., a second CRI).

The base station 105-a may then transmit the reference signal 220 to the UE 115-a via the communication link 205 (e.g., using a transmission beam). The UE 115-a may receive the reference signal 220 by a set of resources (e.g., the set of resources indicated by the control signaling 215) using the receive beam 210. When receiving the reference signal 220, the UE 115-a may measure the reference signal 220 received at the first port 230-a and may measure the reference signal 220 received at the second port 230-b. For example, the UE 115-a may detect a first measurement 235-a (e.g., an SINR, an RSRP) based on the reference signal 220 that the UE 115-a detects by the first port 230-a. Additionally, the UE 115-a may detect a second measurement 235-b (e.g., an SINR, an RSRP) based on the reference signal 220 that the UE 115-a detects by the second port 230-b. In some cases, the SINR and RSRP measurements may be physical layer (e.g., layer 1) SINRs and RSRPs. Additionally, the UE 115-a may detect a single measurement 235 that is based on the reference signal 220 detected by the first port 230-a and the second port 230-b. For example, the UE 115-a may detect a capacity metric or a mutual information metric that is associated with the first and second ports 230.

The UE 115-a may then transmit, to the base station 105-a, the measurement report 225 based on the control signaling 215 (e.g., based on the control signaling 215 triggering the UE 115-a to generate the measurement report 225). The UE 115-a may indicate a resource index (e.g., a CRI) corresponding to each of the ports 230 associated with the measurement report 225. For example, because the measurement report 225 indicates measurements 235 based on the reference signal 220 that is received via the receive beam 210 associated with the first port 230-a and the second port 230-b, the measurement report 225 may include an indication of a resource index corresponding to the first port 230-a and the second port 230-b. Thus, the UE 115-a may report a pair of CRI using the two ports 230-a and 230-b. Here, the first port 230-a may be from a first CRI and the second port 230-b may be from a second CRI.

The measurement report 225 may additionally indicate at least one measurement 235-a. For example, the measurement report 225 may indicate a single measurement 235-a that is the capacity metric or the mutual information metric that is associated with the first and second ports 230. In another example, the measurement report 225 may indicate the first and second measurements 235-a and 235-b that are each associated with different ports 230 of the UE 115-a. That is, the measurement report 225 may indicate the first measurement 235-a (e.g., an SINR, an RSRP) associated with the reference signal 220 detected at the first port 230-a of the UE 115-a. Additionally, the measurement report 225 may indicate the second measurement 235-b that may be the same type of measurement as the measurement 235-a or a different type of measurement as the measurement 235-a. In the example where the measurement report 225 indicates more than one measurement 235, the UE 115-a may indicate each measurement 235 within the measurement report 225 according to a defined order, where the order indicates that the first measurement 235-a is associated with one of the ports 230 and the second measurement 235-b is associated with the other port 230.

In some cases, the UE 115-a and the base station 105-a may communicate via the communication link 205 after the UE 115-a transmits the measurement report 225 to the base station 105-a. For example, the base station 105-a may transmit downlink transmissions via a joint transmission beam and the UE 115-a may receive the downlink transmission via the receive beam 210. That is, based on the measurement report 225, the base station 105-a may select a joint transmission beam including two transmission beams. In some cases, the joint transmission beam may correspond to a first transmission beam associated with a first resource index (e.g., corresponding to the first port 230-a of the UE 115-a) and a second transmission beam associated with a second resource index (e.g., corresponding to the second port 230-b of the UE 115-a). In some other cases, the UE 115-a may only report a measurement report 225 indicating a single resource index (e.g., CRI) that is associated with both ports 230-a and 230-b. Here, the base station 105-a may use a single transmission beam to communicate with the UE 115-a via the receive beam 210.

Figure 3:
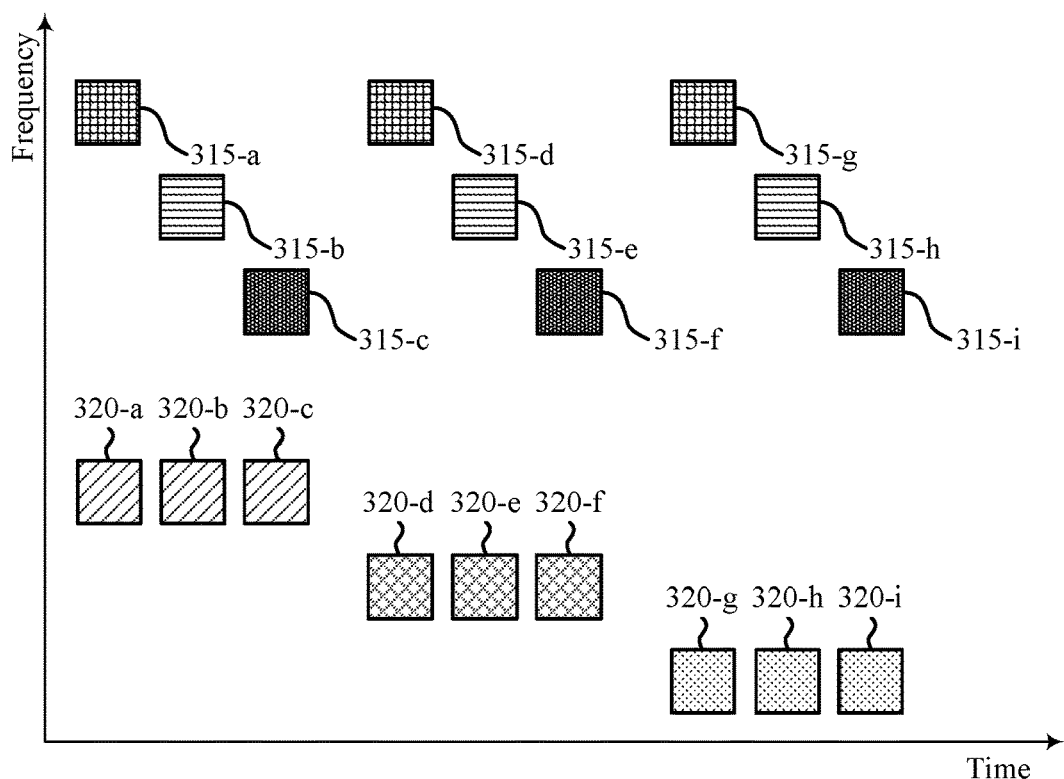
FIG. 3 illustrates an example of a wireless communications system that supports measurement reporting for multi-port receive beams in accordance with aspects of the present disclosure.
Figure 3:
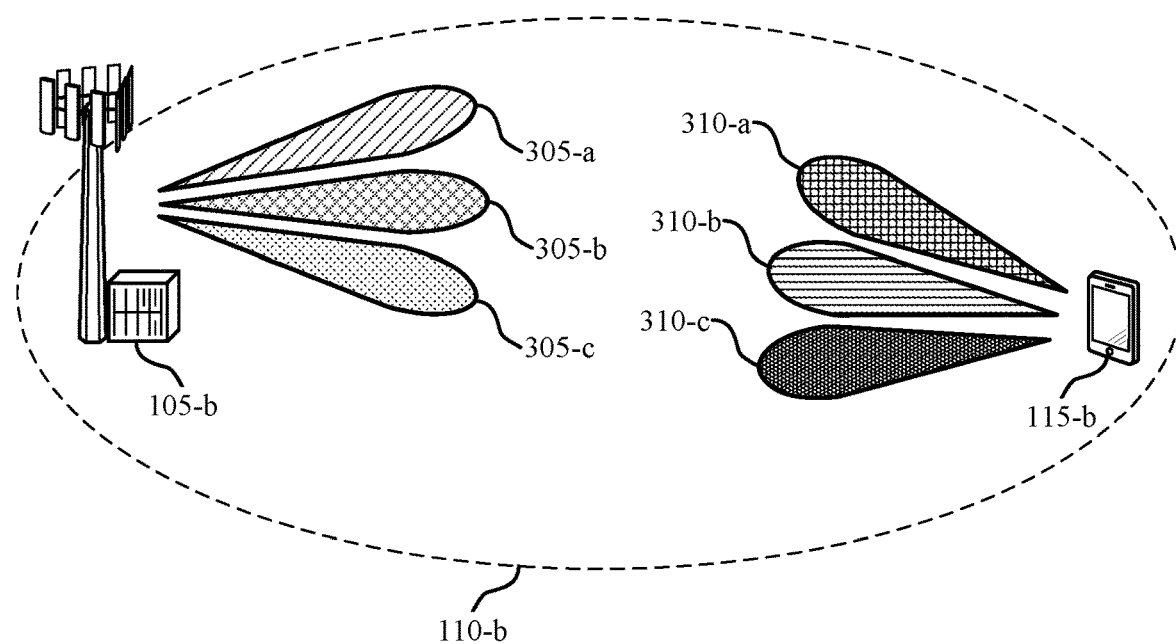

FIG. 3 illustrates an example of a wireless communications system 300 that supports measurement reporting for multi-port receive beams in accordance with aspects of the present disclosure. In some examples, the wireless communications system 300 may implement aspects of wireless communications systems 100 and 200. For example, the wireless communications system 200 may include base station 105-b, UE 115-b, and geographic coverage area 110-b, which may be examples of a base station 105, a UE 115, and a geographic coverage area 110, respectively, as described with reference to FIGS. 1 and 2. Additionally, the UE 115-b may provide one or more measurement reports to the base station 105-b as described with reference to FIG. 2.

The base station 105-b and the UE 115-b may support directional transmissions and may communicate via one or more directional beams. For example, the base station 105-b may be configured to communicate with one or more UEs 115 including at least the UE 115-b using the transmission beams 305. Additionally, the UE 115-b may be configured to receive one or more transmissions via the receive beams 310. In some cases, the UE 115-b may include multiple ports. Here, one or more of the receive beams 310 may be associated with more than one port. That is, when the UE 115-b is using a receive beam 310 associated with multiple ports, the UE 115-b may monitor multiple sets of resources each associated with one of the ports of the receive beam 310.

The base station 105-b and the UE 115-b may communicate via a beam pair that includes a transmission beam 305 and a receive beam 310. The base station 105-b and the UE 115-b may perform an iterative joint beam pair selection procedure to select a beam pair. That is, the iterative joint beam pair selection procedure may enable the base station 105-b and the UE 115-b to identify a pair of beams that is associated with a higher communication reliability than other potential beam pairs. The base station 105-b may communicate, to the UE 115-b, control signaling (e.g., as described with reference to FIG. 2) including a control message that triggers the UE 115-b to perform the iterative joint beam pair selection procedure. The control message may additionally indicate a first set of repeating resources 315 associated with the receive beams 310 and a second set of repeating resources 320 associated with the transmission beams 305. In some cases, the first set of resources 315 and the second set of resources 320 may be non-zero-power-channel state information-reference signal (NZP-CSI-RS) resources. Additionally, both the first set of resources 315 and the second set of resources 320 may include channel measurement resources as well as interference measurement resources. For example, each of the first set of resources 315 may include a first subset of resources associated with channel measurement resources and a second subset of resources associated with interference measurement resources. Additionally, each of the second set of resources 320 may include a first subset of resources associated with channel measurement resources and a second subset of resources associated with interference measurement resources.

During the iterative joint beam pair selection procedure, the base station 105-b and the UE 115-b may perform transmission beam refinement to select a transmission beam 305 for communications between the base station 105-b and the UE 115-b. Additionally, the base station 105-b and the UE 115-b may perform receive beam refinement to select a receive beam 310 for communications between the base station 105-b and the UE 115-b. For the iterative joint beam pair selection procedure, the base station 105-b may transmit one or more reference signals (e.g., NZP-CSI-RSs) using the second set of resources 320. Additionally, the UE 115-b may monitor the first set of resources 315 for the one or more reference signals. For example, the base station 105-b may utilize the second set of resources 320-g to transmit a reference signal using the third transmission beam 305-c. Here, the UE 115-b may monitor the first set of resources 315-g using the first receive beam 310-a. The UE 115-b may utilize a first portion of the first set of resources 315-g that are channel measurement resources to detect one or more measurements associated with the reference signal (e.g., SINR, RSRP). Additionally, the UE 115-b may utilize a second portion of the first set of resources 315-g that are interference measurement resources to detect interference associated with the reference signal.

During an iteration of the joint beam pair selection procedure, the base station 105-b may utilize a single transmission beam 305 to transmit reference signals while the UE 115-b monitors for the reference signal using a set of receive beams 310. For example, the base station 105-b may transmit a set of reference signals (e.g., NZP-CSI-RSs) using a portion of the second set of resources 320-a, 320-b, and 320-b (e.g., a set of time and frequency resources that repeat three times) that are each associated with a single transmission beam 305-a. Additionally, the UE 115-b may monitor a portion of the first set of resources 315-a, 315-b, and 315-c (e.g., a set of time and frequency resources that may, in some cases, at least partially overlap in the time domain with the set of resources 320-a, 320-b, and 320-c) that are each associated with different receive beams 310-a, 310-b, and 310-c, respectively.

After transmitting a reference signal by a first transmission beam 305-a while the UE 115-b monitors the portion of the first set of resources 315-a, 315-b, and 315-c for the reference signals using a set of receive beams (e.g., receive beam 310-a, 310-b, and 310-c), the base station 105-b may transmit a reference signal by a second transmission beam 305-b while the UE 115-b monitors the second set of resources 315-d, 315-e, and 315-f using each of the set of receive beams 310-a, 310-b, and 310-c. The iterative joint beam pair selection procedure may continue for each of the transmission beams 305. In some other cases, an iteration of the joint beam pair selection procedure may correspond to the UE 115-b utilizing a single receive beam 310 to monitor the first set of resources 315 for reference signals while the base station 105-b transmits reference signals using a set of transmission beams 305-a, 305-b, and 305-c.

Based on performing each iteration of the iterative joint beam pair selection procedure, the UE 115-b and the base station 105-b may select a transmission beam 305 and a receive beam 310 for communications between the UE 115-b and the base station 105-b. For example, the base station 105-b and UE 115-b may select the beam pair that is associated with a channel metric indicating a highest reliability (e.g., a beam pair associated with a highest SINR, a highest RSRP, or both). Additionally, the UE 115-b may provide a beam selection report indicating the selected transmission beam 305, the selected receive beam 310, or both, to the base station 105-b. In some cases, the UE 115-b may additionally provide a measurement report for the selected beam pair (e.g., as described with reference to FIG. 3). In some cases, providing a measurement report for the beam pair after performing the iterative joint beam pair selection procedure may improve a reliability of communications between the base station 105-b and the UE 115-b when compared to a measurement report provided prior to the completion of the iterative joint beam pair selection procedure as the metrics may be sensitive to the selected receive beam 310. After performing the iterative joint beam pair selection procedure, the base station 105-b and the UE 115-b may communicate using the selected transmission beam 305 and the selected receive beam 310.

Figure 4:
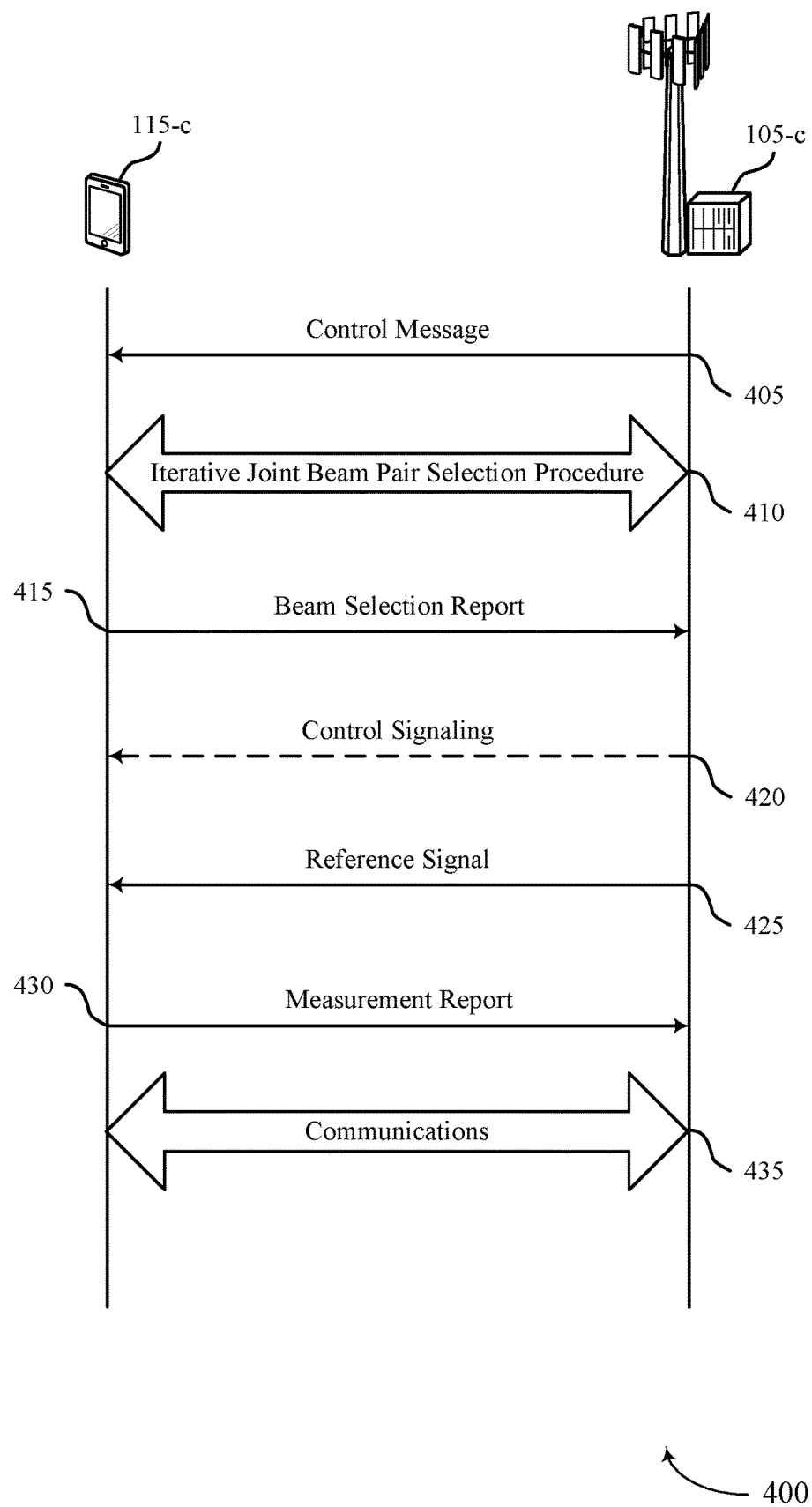
FIG. 4 illustrates an example of a process flow that supports measurement reporting for multi-port receive beams in accordance with aspects of the present disclosure.

FIG. 4 illustrates an example of a process flow 400 that supports measurement reporting for multi-port receive beams in accordance with aspects of the present disclosure. In some examples, the process flow 400 may implement aspects of wireless communications systems 100, 200, and 300. For example, the process flow 400 may include base station 105-c and UE 115-c, which may be examples of a base station 105 and a UE 115 as described with reference to FIGS. 1 through 3.

At 405, the base station 105-c may transmit a control message that triggers the UE 115-c to perform an iterative joint beam pair selection procedure. In some cases, the control message may indicate a first resource set of repeating resources for selecting the receive beam from a set of different receive beams and a second resource set of repeating resources for selecting a transmission beam from a set of different transmission beams. In some cases, the first resource set of repeating resources include a first set of channel measurement resources and a first set of interference measurement resources, and the second resource set of repeating resources includes a second set of channel measurement resources that differs from the first set of channel measurement resources and a second set of interference measurement resources that differs from the first set of interference measurement resources. In some instances, each iteration of the first resource set at least partially overlaps in time with each iteration of the second resource set.

At 410, the UE 115-c and the base station 105-c may perform an iterative joint beam pair selection procedure (e.g., as triggered by the control message at 405). During the iterative joint beam pair selection procedure, the UE 115-c may monitor for a first reference signal in each resource over one or more iterations of the first resource set of repeating resources to select the receive beam. Additionally, the UE 115-c may transmit a second reference signal in each resource over one or more iterations of the second resource set. In some cases, the iterative joint beam pair selection procedure may include the UE 115-c, the base station 105-c, or both selecting the transmission beam from the set of different transmission beams based on monitoring the first set of channel measurement resources and the first set of interference measurement resources. Additionally, the iterative joint beam pair selection procedure may include the UE 115-c, the base station 105-c, or both selecting the receive beam from the set of different receive beams based on receiving a second reference signal over the set of receive beams via the second set of channel measurement resources and the second set of interference measurement resources.

At 415, the UE 115-c may transmit a beam selection report indicating the transmission beam, the receive beam, or both, selected using the iterative joint beam pair selection procedure.

At 420, the base station 105-c may optionally transmit control signaling configuring the UE 115-c to generate a measurement report associated with a receive beam at a first port of the UE 115-c and a second port of the UE 115-c. In some cases, the base station 105-c may instead transmit the control signaling configuring the UE 115-c to generate the measurement report at 405. In either case, the control signaling may be RRC signaling. Additionally, the control signaling may indicate a set of reference signal resources, where the reference signal is received via the set of reference signal resources at the first port and the second port.

At 425, the base station 105-c may transmit a reference signal to the UE 115-c. The UE 115-c may receive the reference signal via the receive beam at each of the first port and the second port. The reference signal may be a CSI-RS.

At 430, the UE 115-c may transmit, to the base station 105-c, the measurement report indicating at least one measurement, a first resource index corresponding to the first port of the UE 115-c, and a second resource index corresponding to the second port of the UE 115-c based on the control signaling. In some instances, the first resource index may be a first CRI and the second resource index may be a second CRI. In some cases, the UE 115-c may transmit the measurement report indicating the first resource index corresponding to a first reference signal resource of the set of reference signal resources and the second resource index corresponding to a second reference signal resource of the set of reference signal resources.

In some cases, the measurement report may include a first measurement and a second measurement. For example, the UE 115-c may measure the reference signal at the first port to generate the first measurement. Additionally, the UE 115-c may measure the reference signal at the second port to generate the second measurement. The first and second measurements may be one or more of an SINR or an RSRP. In some cases, the UE 115-c may transmit the first and second measurements in a defined order to indicate that the first measurement is associated with one of the first port or the second port and that the second measurement is associated with the other of the first port or the second port. Here, the first measurement may be a first reporting quantity type measured at the first port of the UE 115-c and the second measurement may be the first reporting quantity type or a second reporting quantity type measured at the second port of the UE 115-c. In some other examples, the at least one measurement may be a first capacity metric or a first mutual information metric for the first port and the second port.

At 435, the UE 115-c and the base station 105-c may communicate using the selected beam pair based on the UE 115-c transmitting the measurement report at 430. In some cases, the communications may include the UE 115-c receiving a downlink transmission (e.g., from the base station 105-c) via a joint transmission beam generated based on a first transmission beam corresponding to the first resource index and a second transmission beam corresponding to the second resource index.

Figure 5:
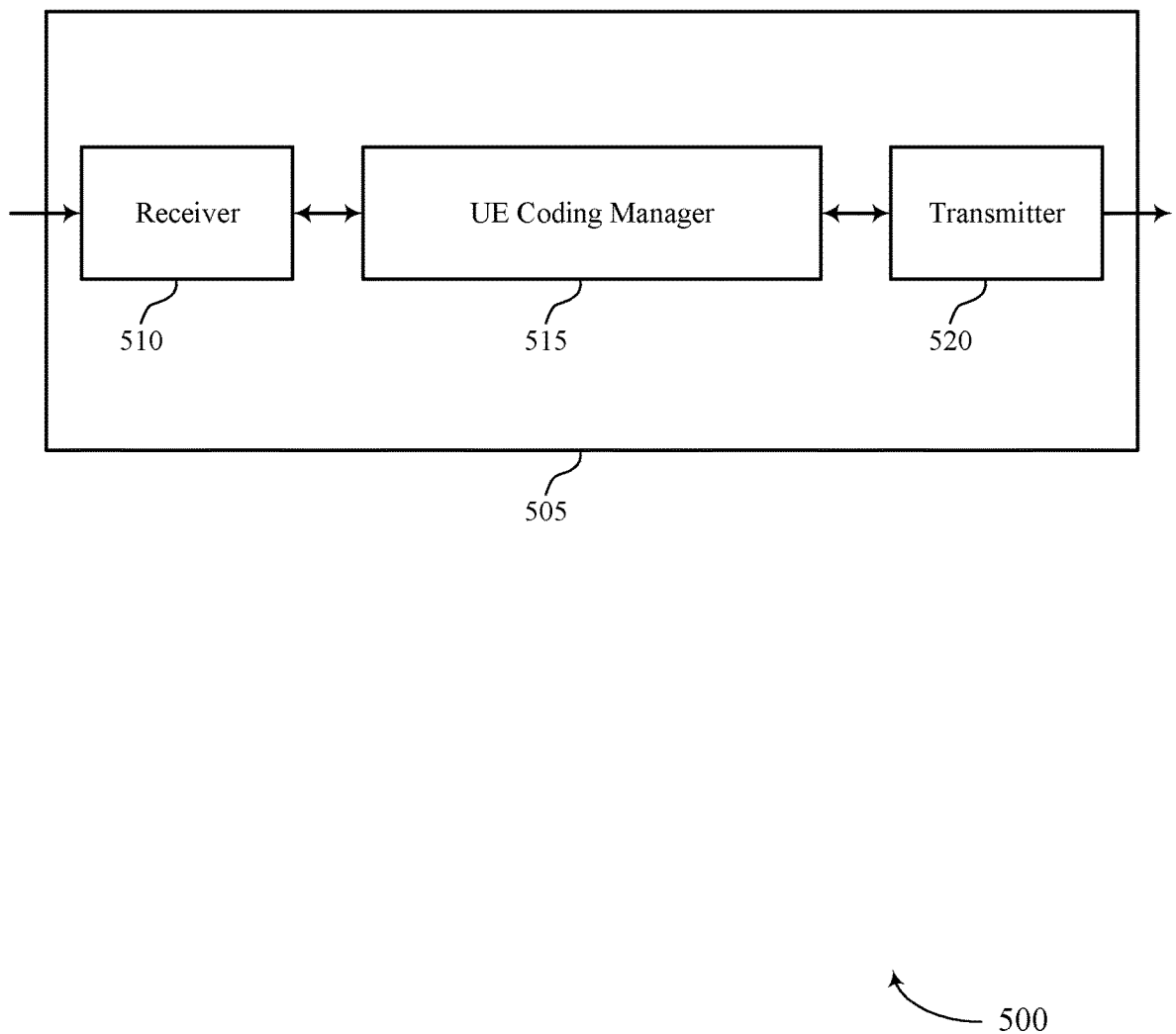
FIGS. 5 and 6 show block diagrams of devices that support measurement reporting for multi-port receive beams in accordance with aspects of the present disclosure.

FIG. 5 shows a block diagram 500 of a device 505 that supports measurement reporting for multi-port receive beams in accordance with aspects of the present disclosure. The device 505 may be an example of aspects of a UE 115 as described herein. The device 505 may include a receiver 510, a UE coding manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to measurement reporting for multi-port receive beams, etc.). Information may be passed on to other components of the device 505. The receiver 510 may be an example of aspects of the transceiver 820 described with reference to FIG. 8. The receiver 510 may utilize a single antenna or a set of antennas.

The UE coding manager 515 may receive, from a base station, control signaling configuring the UE to generate a measurement report associated with a receive beam at a first port of the UE and a second port of the UE, receive a reference signal via the receive beam at each of the first port and the second port, and transmit, to the base station, the measurement report indicating at least one measurement, a first resource index corresponding to the first port of the UE, and a second resource index corresponding to the second port of the UE based on the control signaling. The UE coding manager 515 may be an example of aspects of the UE coding manager 810 described herein.

The UE coding manager 515, or its sub-components, may be implemented in hardware, code (e.g., software or firmware) executed by a processor, or any combination thereof. If implemented in code executed by a processor, the functions of the UE coding manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE coding manager 515, or its sub-components, may be physically located at various positions, including being distributed such that portions of functions are implemented at different physical locations by one or more physical components. In some examples, the UE coding manager 515, or its sub-components, may be a separate and distinct component in accordance with various aspects of the present disclosure. In some examples, the UE coding manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
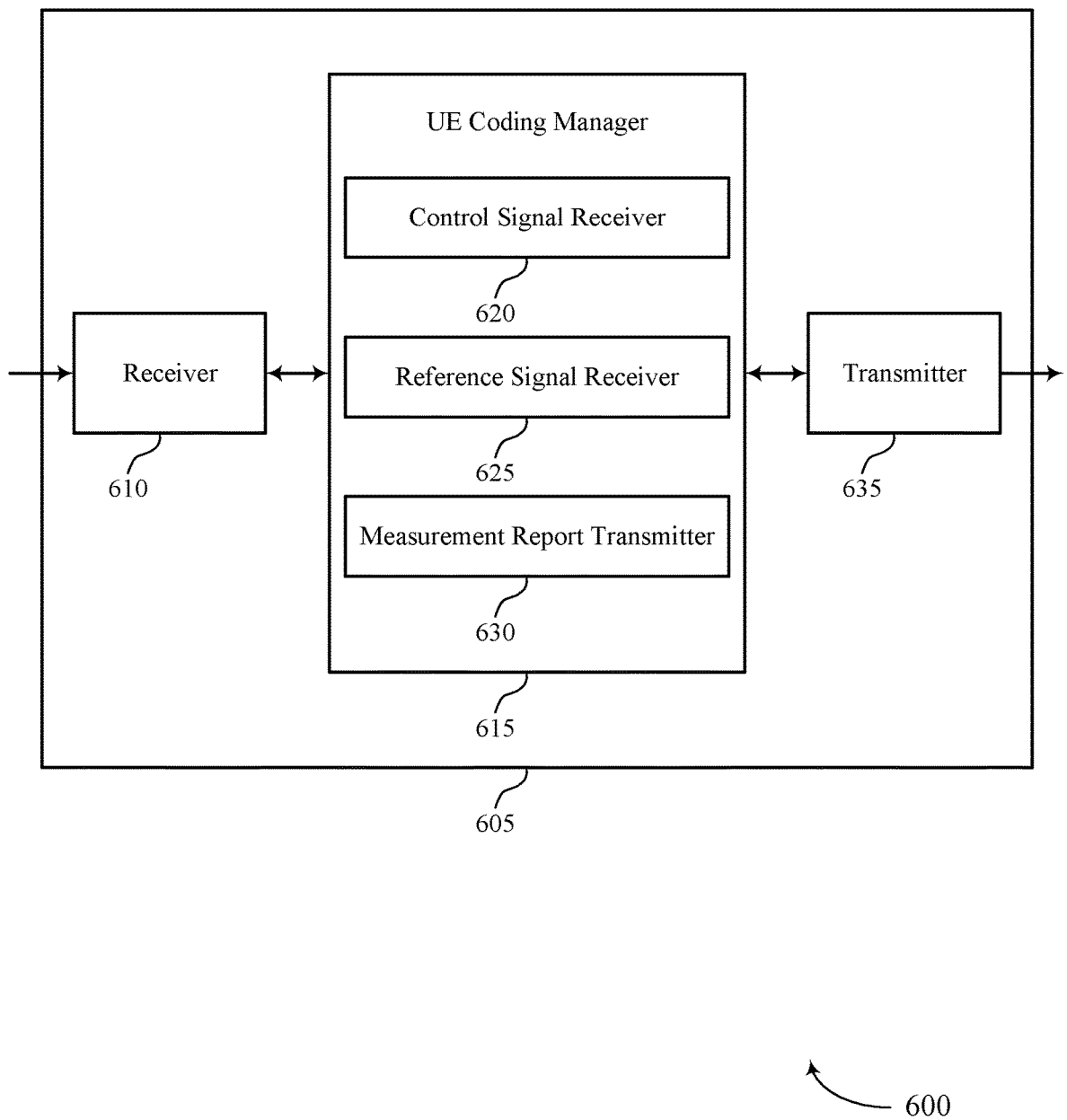

FIG. 6 shows a block diagram 600 of a device 605 that supports measurement reporting for multi-port receive beams in accordance with aspects of the present disclosure. The device 605 may be an example of aspects of a device 505, or a UE 115 as described herein. The device 605 may include a receiver 610, a UE coding manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to measurement reporting for multi-port receive beams, etc.). Information may be passed on to other components of the device 605. The receiver 610 may be an example of aspects of the transceiver 820 described with reference to FIG. 8. The receiver 610 may utilize a single antenna or a set of antennas.

The UE coding manager 615 may be an example of aspects of the UE coding manager 515 as described herein. The UE coding manager 615 may include a control signal receiver 620, a reference signal receiver 625, and a measurement report transmitter 630. The UE coding manager 615 may be an example of aspects of the UE coding manager 810 described herein.

The control signal receiver 620 may receive, from a base station, control signaling configuring the UE to generate a measurement report associated with a receive beam at a first port of the UE and a second port of the UE.

The reference signal receiver 625 may receive a reference signal via the receive beam at each of the first port and the second port.

The measurement report transmitter 630 may transmit, to the base station, the measurement report indicating at least one measurement, a first resource index corresponding to the first port of the UE, and a second resource index corresponding to the second port of the UE based on the control signaling.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
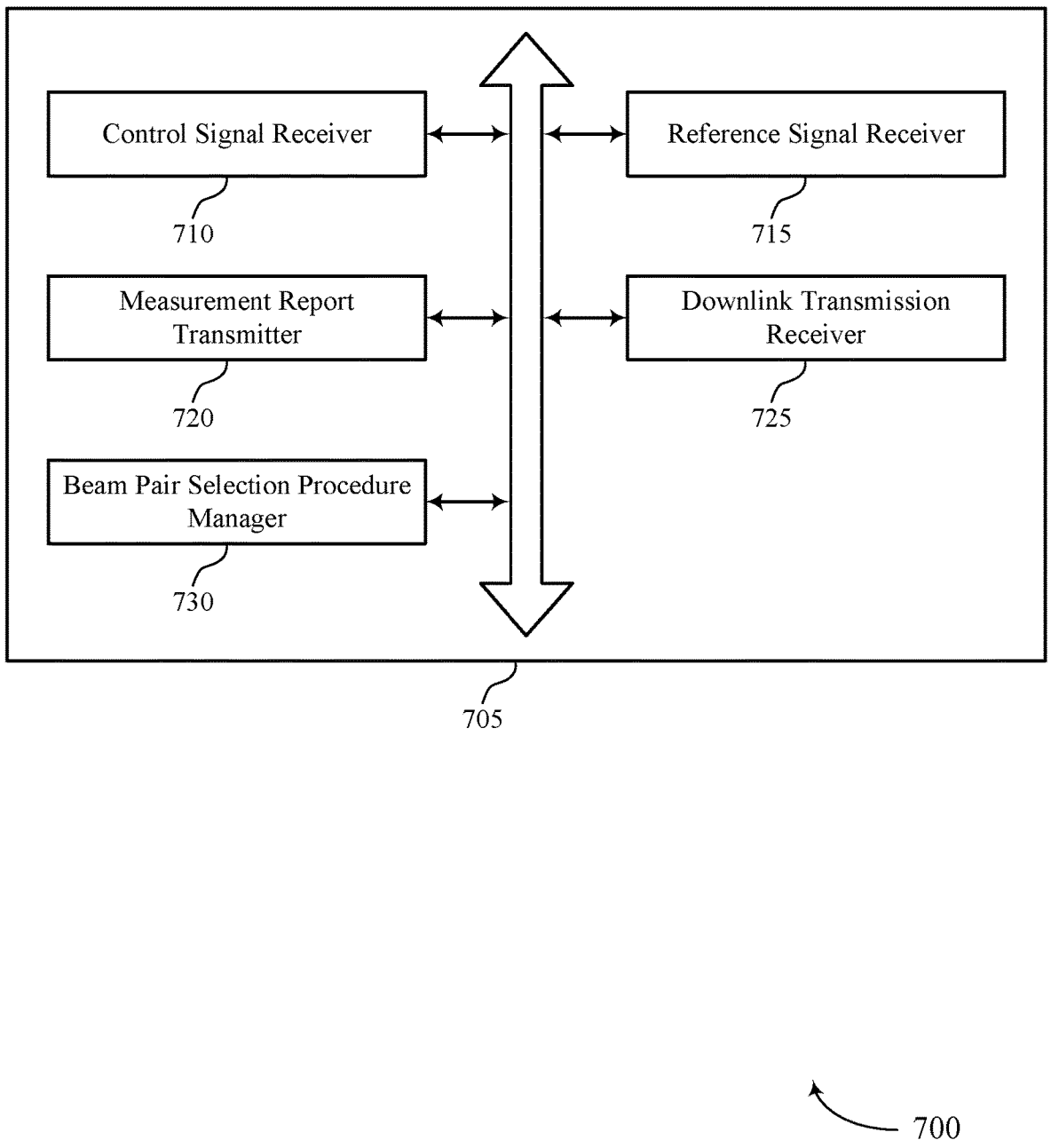
FIG. 7 shows a block diagram of a UE coding manager that supports measurement reporting for multi-port receive beams in accordance with aspects of the present disclosure.

FIG. 7 shows a block diagram 700 of a UE coding manager 705 that supports measurement reporting for multi-port receive beams in accordance with aspects of the present disclosure. The UE coding manager 705 may be an example of aspects of a UE coding manager 515, a UE coding manager 615, or a UE coding manager 810 described herein. The UE coding manager 705 may include a control signal receiver 710, a reference signal receiver 715, a measurement report transmitter 720, a downlink transmission receiver 725, and a beam pair selection procedure manager 730. Each of these modules may communicate, directly or indirectly, with one another (e.g., via one or more buses).

The control signal receiver 710 may receive, from a base station, control signaling configuring the UE to generate a measurement report associated with a receive beam at a first port of the UE and a second port of the UE. In some examples, the control signal receiver 710 may receive RRC signaling indicating to generate the measurement report. In some cases, the control signal receiver 710 may receive the control signaling indicating a set of reference signal resources, where the reference signal is received via the set of reference signal resources at the first port and the second port.

The reference signal receiver 715 may receive a reference signal via the receive beam at each of the first port and the second port. In some examples, the reference signal receiver 715 may receive the reference signal that is a channel state information reference signal.

The measurement report transmitter 720 may transmit, to the base station, the measurement report indicating at least one measurement, a first resource index corresponding to the first port of the UE, and a second resource index corresponding to the second port of the UE based on the control signaling. In some examples, the measurement report transmitter 720 may transmit at least one measurement including a first measurement and a second measurement in the measurement report in a defined order to indicate that the first measurement is associated with one of the first port or the second port and that the second measurement is associated with the other of the first port or the second port. In some cases, the measurement report transmitter 720 may transmit the measurement report indicating the at least one measurement that is a first capacity metric or a first mutual information metric for the first port and the second port.

In some instances, the measurement report transmitter 720 may transmit at least one measurement including a first measurement that is a first reporting quantity type measured at the first port of the UE and a second measurement that is the first reporting quantity type or a second reporting quantity type measured at the second port of the UE. In some examples, the measurement report transmitter 720 may transmit the measurement report indicating the first resource index that is a first CRI, and the second resource index that is a second CRI. In some cases, the measurement report transmitter 720 may measure the reference signal at the first port to generate the first measurement. In some instances, the measurement report transmitter 720 may measure the reference signal at the second port to generate the second measurement.

In some examples, the measurement report transmitter 720 may transmit at least one measurement including a first measurement and a second measurement in the measurement report, the measurement report indicating the first measurement and the second measurement that each are one or more of a SINR of the reference signal or a receive power of the reference signal. In some cases, the measurement report transmitter 720 may transmit the measurement report indicating the first resource index corresponding to a first reference signal resource of the set of reference signal resources and the second resource index corresponding to a second reference signal resource of the set of reference signal resources.

The downlink transmission receiver 725 may receive a downlink transmission via a joint transmission beam generated based on a first transmission beam corresponding to the first resource index and a second transmission beam corresponding to the second resource index.

The beam pair selection procedure manager 730 may receive a control message that triggers the UE to perform an iterative joint beam pair selection procedure and indicates a first resource set of repeating resources for selecting the receive beam from a set of different receive beams and a second resource set of repeating resources for selecting a transmission beam from a set of different transmission beams. In some examples, the beam pair selection procedure manager 730 may select the transmission beam from the set of different transmission beams based on monitoring the first set of channel measurement resources and the first set of interference measurement resources. In some cases, the beam pair selection procedure manager 730 may select the receive beam from the set of different receive beams based on receiving a second reference signal over the set of receive beams via the second set of channel measurement resources and the second set of interference measurement resources. In some instances, the beam pair selection procedure manager 730 may transmit a beam selection report indicating the transmission beam, the receive beam, or both, selected using the iterative joint beam pair selection procedure.

In some examples, the beam pair selection procedure manager 730 may monitor, during the iterative joint beam pair selection procedure, for a first reference signal in each resource over one or more iterations of the first resource set of repeating resources to select the receive beam. In some cases, the beam pair selection procedure manager 730 may transmit, during the iterative joint beam pair selection procedure, a second reference signal in each resource over one or more iterations of the second resource set. In some instances, the first resource set of repeating resources include a first set of channel measurement resources and a first set of interference measurement resources, and the second resource set of repeating resources includes a second set of channel measurement resources that differs from the first set of channel measurement resources and a second set of interference measurement resources that differs from the first set of interference measurement resources. In some cases, each iteration of the first resource set at least partially overlaps in time with each iteration of the second resource set.

Figure 8:
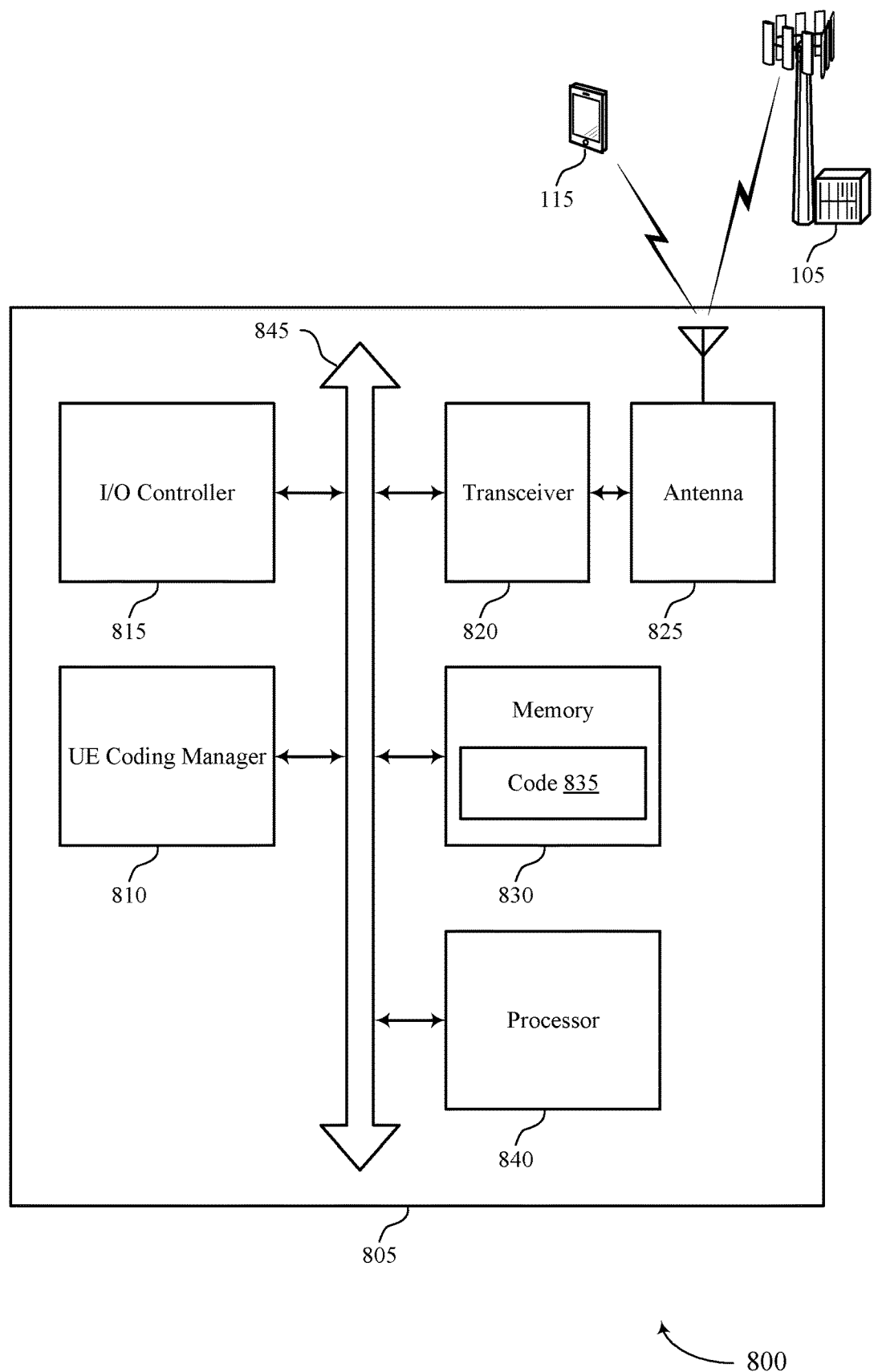
FIG. 8 shows a diagram of a system including a device that supports measurement reporting for multi-port receive beams in accordance with aspects of the present disclosure.

FIG. 8 shows a diagram of a system 800 including a device 805 that supports measurement reporting for multi-port receive beams in accordance with aspects of the present disclosure. The device 805 may be an example of or include the components of device 505, device 605, or a UE 115 as described herein. The device 805 may include components for bi-directional voice and data communications including components for transmitting and receiving communications, including a UE coding manager 810, an I/O controller 815, a transceiver 820, an antenna 825, memory 830, and a processor 840. These components may be in electronic communication via one or more buses (e.g., bus 845).

The UE coding manager 810 may receive, from a base station, control signaling configuring the UE to generate a measurement report associated with a receive beam at a first port of the UE and a second port of the UE, receive a reference signal via the receive beam at each of the first port and the second port, and transmit, to the base station, the measurement report indicating at least one measurement, a first resource index corresponding to the first port of the UE, and a second resource index corresponding to the second port of the UE based on the control signaling.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting measurement reporting for multi-port receive beams).

The code 835 may include instructions to implement aspects of the present disclosure, including instructions to support PREAMBLE. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
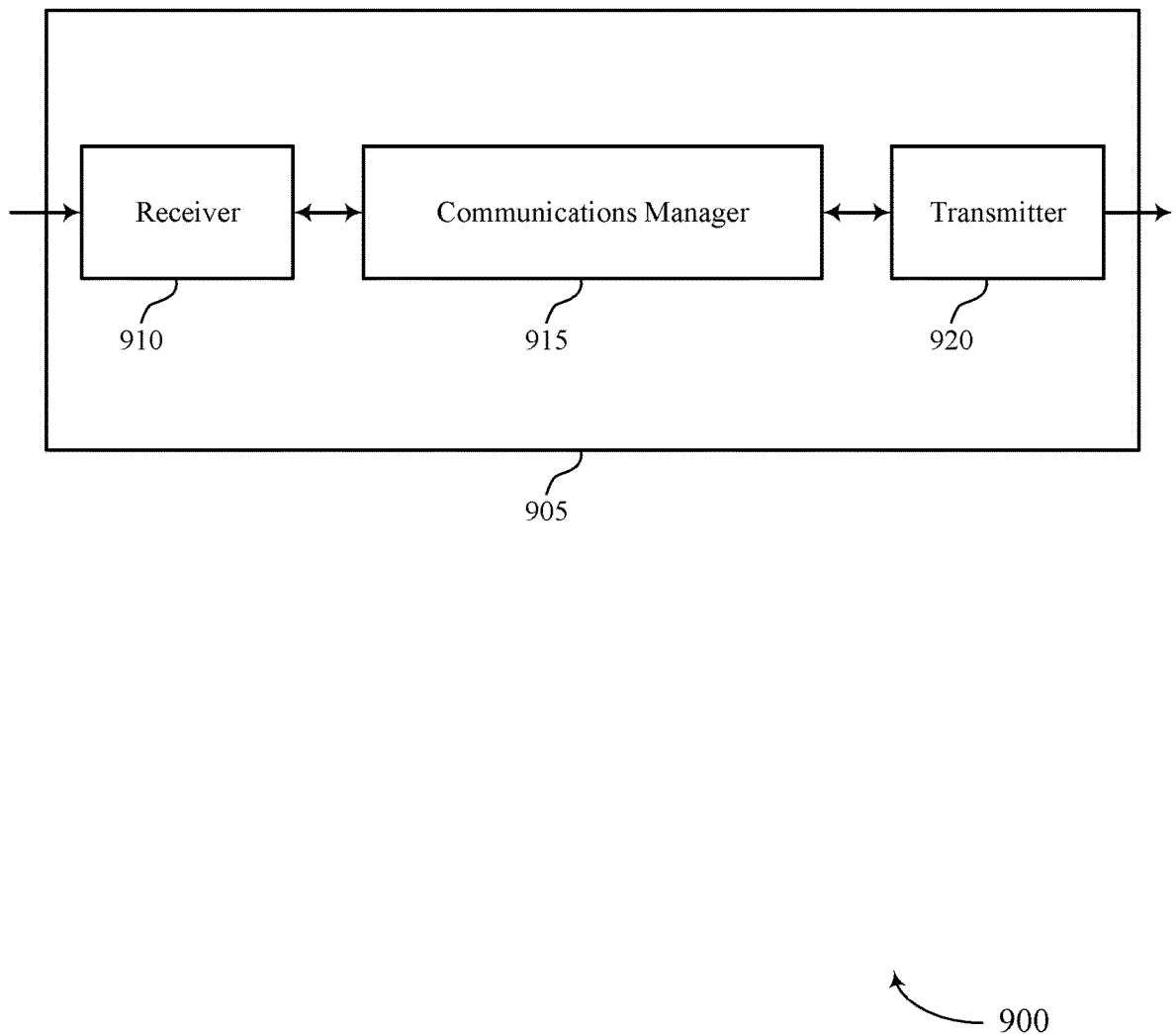
FIGS. 9 and 10 show block diagrams of devices that support measurement reporting for multi-port receive beams in accordance with aspects of the present disclosure.

FIG. 9 shows a block diagram 900 of a device 905 that supports measurement reporting for multi-port receive beams in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to measurement reporting for multi-port receive beams, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, control signaling indicating to generate a measurement report associated with a receive beam at a first port of the UE and a second port of the UE, transmit a reference signal based on the control signaling, and receive, from the UE, the measurement report indicating at least one measurement, a first resource index corresponding to the first port of the UE, and a second resource index corresponding to the second port of the UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
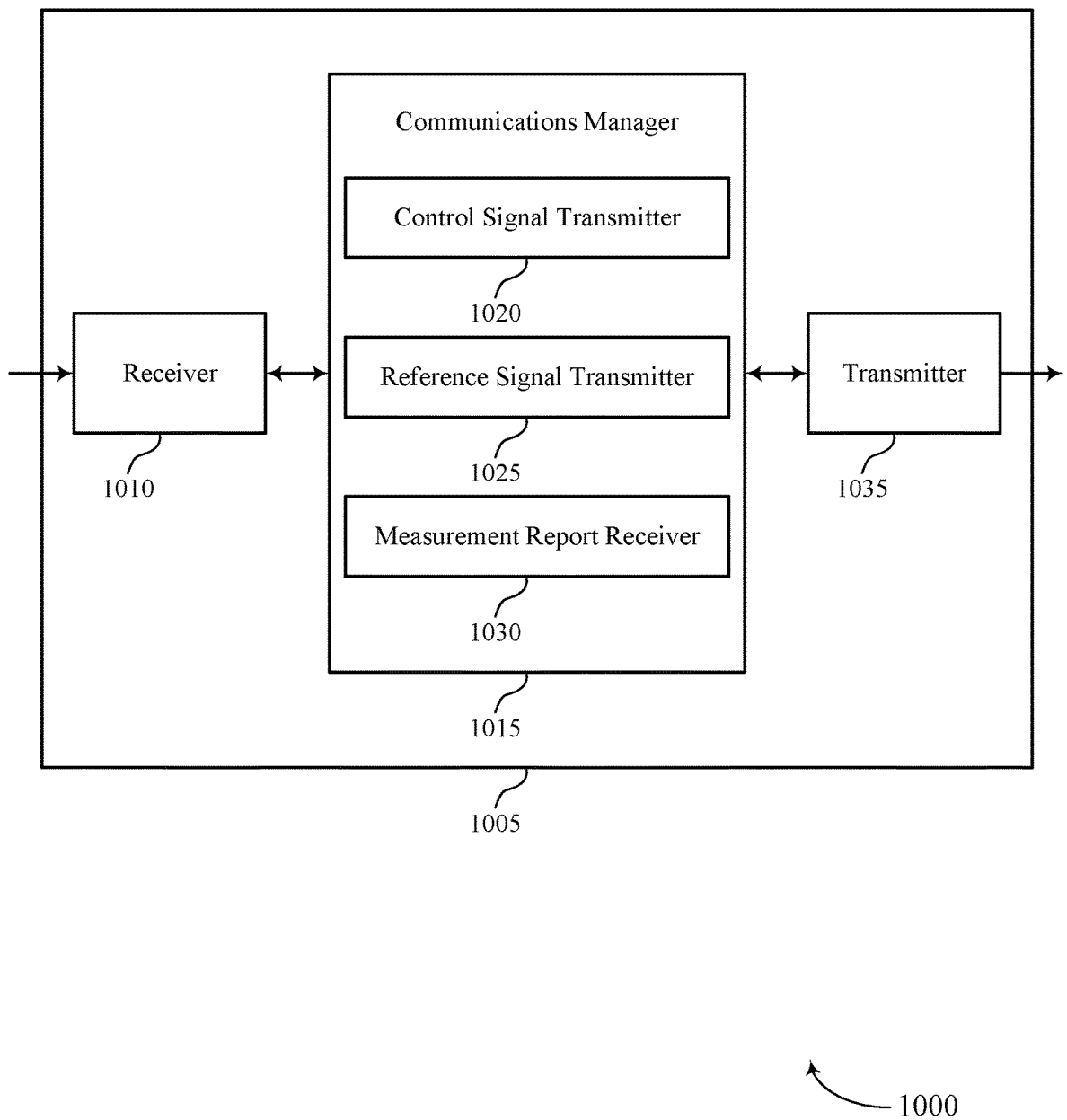

FIG. 10 shows a block diagram 1000 of a device 1005 that supports measurement reporting for multi-port receive beams in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to measurement reporting for multi-port receive beams, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control signal transmitter 1020, a reference signal transmitter 1025, and a measurement report receiver 1030. The communications manager 1015 may be an example of aspects of the communications manager 1210 described herein.

The control signal transmitter 1020 may transmit, to a UE, control signaling indicating to generate a measurement report associated with a receive beam at a first port of the UE and a second port of the UE.

The reference signal transmitter 1025 may transmit a reference signal based on the control signaling.

The measurement report receiver 1030 may receive, from the UE, the measurement report indicating at least one measurement, a first resource index corresponding to the first port of the UE, and a second resource index corresponding to the second port of the UE.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
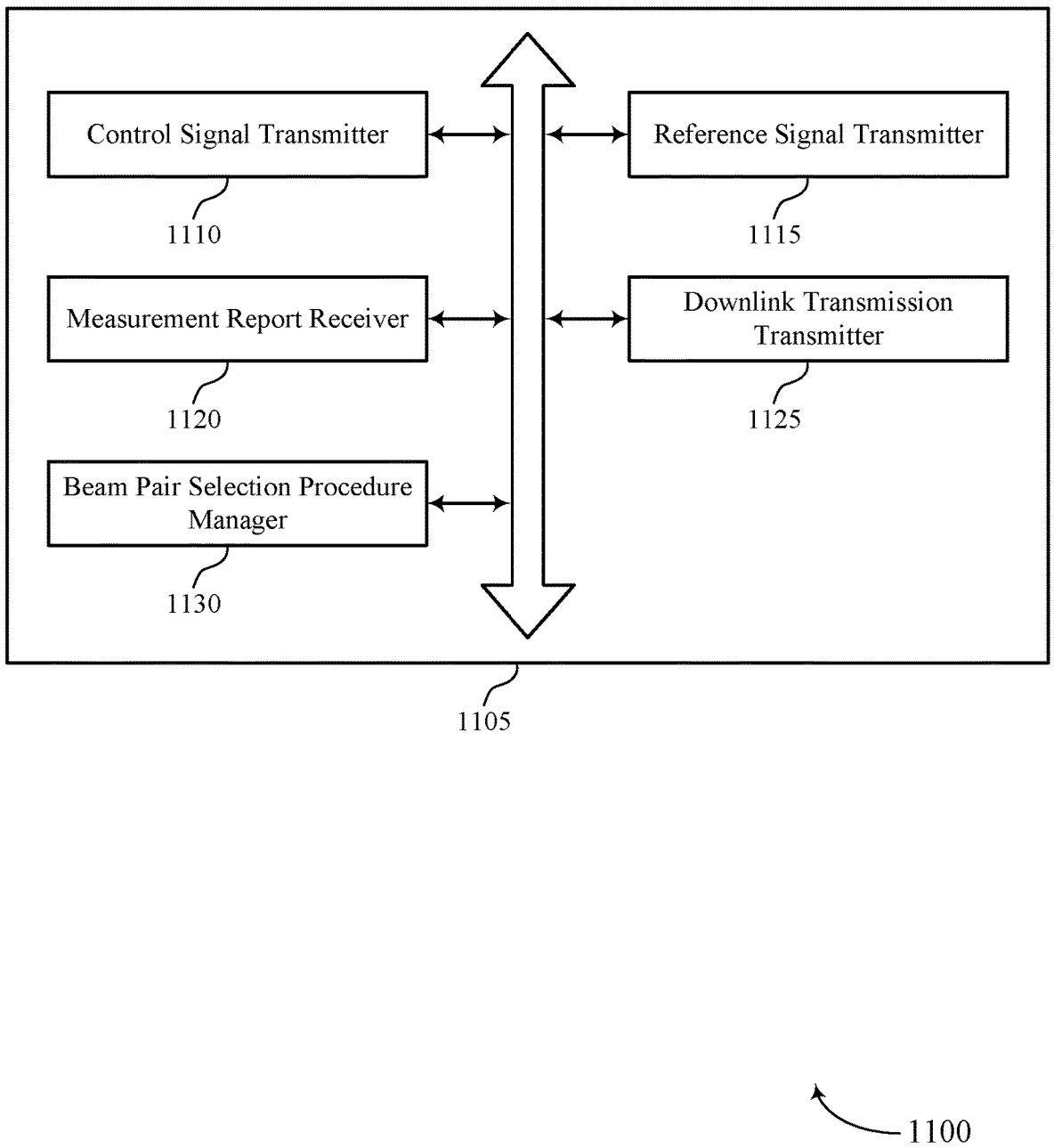
FIG. 11 shows a block diagram of a communications manager that supports measurement reporting for multi-port receive beams in accordance with aspects of the present disclosure.

FIG. 11 shows a block diagram 1100 of a communications manager 1105 that supports measurement reporting for multi-port receive beams in accordance with aspects of the present disclosure. The communications manager 1105 may be an example of aspects of a communications manager 915, a communications manager 1015, or a communications manager 1210 described herein. The communications manager 1105 may include a control signal transmitter 1110, a reference signal transmitter 1115, a measurement report receiver 1120, a downlink transmission transmitter 1125, and a beam pair selection procedure manager 1130. Each of these modules may communicate, directly or indirectly, with one another (e.g., via one or more buses).

The control signal transmitter 1110 may transmit, to a UE, control signaling indicating to generate a measurement report associated with a receive beam at a first port of the UE and a second port of the UE.

In some examples, the control signal transmitter 1110 may transmit radio resource control signaling indicating to generate the measurement report.

In some examples, the control signal transmitter 1110 may transmit the control signaling indicating a set of reference signal resources, where the reference signal is transmitted via the set of reference signal resources at the first port and the second port.

The reference signal transmitter 1115 may transmit a reference signal based on the control signaling. In some examples, the reference signal transmitter 1115 may transmit the reference signal that is a channel state information reference signal.

The measurement report receiver 1120 may receive, from the UE, the measurement report indicating at least one measurement, a first resource index corresponding to the first port of the UE, and a second resource index corresponding to the second port of the UE. In some examples, the measurement report receiver 1120 may receive at least one measurement including a first measurement and a second measurement in the measurement report in a defined order to indicate that the first measurement is associated with one of the first port or the second port and that the second measurement is associated with the other of the first port or the second port. In some cases, the measurement report receiver 1120 may receive the measurement report indicating the at least one measurement that is a first capacity metric or a first mutual information metric for the first port and the second port. In some instances, the measurement report receiver 1120 may receive at least one measurement including a first measurement that is a first reporting quantity type measured at the first port of the UE and a second measurement that is the first reporting quantity type or a second reporting quantity type measured at the second port of the UE.

In some examples, the measurement report receiver 1120 may receive the measurement report indicating the first resource index that is a first CRI, and the second resource index that is a second CRI. In some cases, the measurement report receiver 1120 may receive at least one measurement including a first measurement and a second measurement in the measurement report, the measurement report indicating the first measurement and the second measurement that each are one or more of a SINR of the RSRP of the reference signal. In some instances, the measurement report receiver 1120 may receive the measurement report indicating the first resource index corresponding to a first reference signal resource of the set of reference signal resources and the second resource index corresponding to a second reference signal resource of the set of reference signal resources.

The downlink transmission transmitter 1125 may transmit a downlink transmission via a joint transmission beam generated based on a first transmission beam corresponding to the first resource index and a second transmission beam corresponding to the second resource index.

The beam pair selection procedure manager 1130 may transmit a control message that triggers the UE to perform an iterative joint beam pair selection procedure with the base station and indicates a first resource set of repeating resources for selecting the receive beam from a set of different receive beams and a second resource set of repeating resources for selecting a transmission beam from a set of different transmission beams. In some examples, the beam pair selection procedure manager 1130 may receive a beam selection report indicating the transmission beam, the receive beam, or both, selected by the UE using the iterative joint beam pair selection procedure. In some cases, the beam pair selection procedure manager 1130 may transmit, during the iterative joint beam pair selection procedure, a first reference signal in each resource over one or more iterations of the first resource set of repeating resources. In some instances, the beam pair selection procedure manager 1130 may receive, during the iterative joint beam pair selection procedure, a second reference signal in each resource over one or more iterations of the second resource set.

In some examples, the first resource set of repeating resources include a first set of channel measurement resources and a first set of interference measurement resources, and the second resource set of repeating resources includes a second set of channel measurement resources that differs from the first set of channel measurement resources and a second set of interference measurement resources that differs from the first set of interference measurement resources. In some cases, each iteration of the first resource set at least partially overlaps in time with each iteration of the second resource set.

Figure 12:
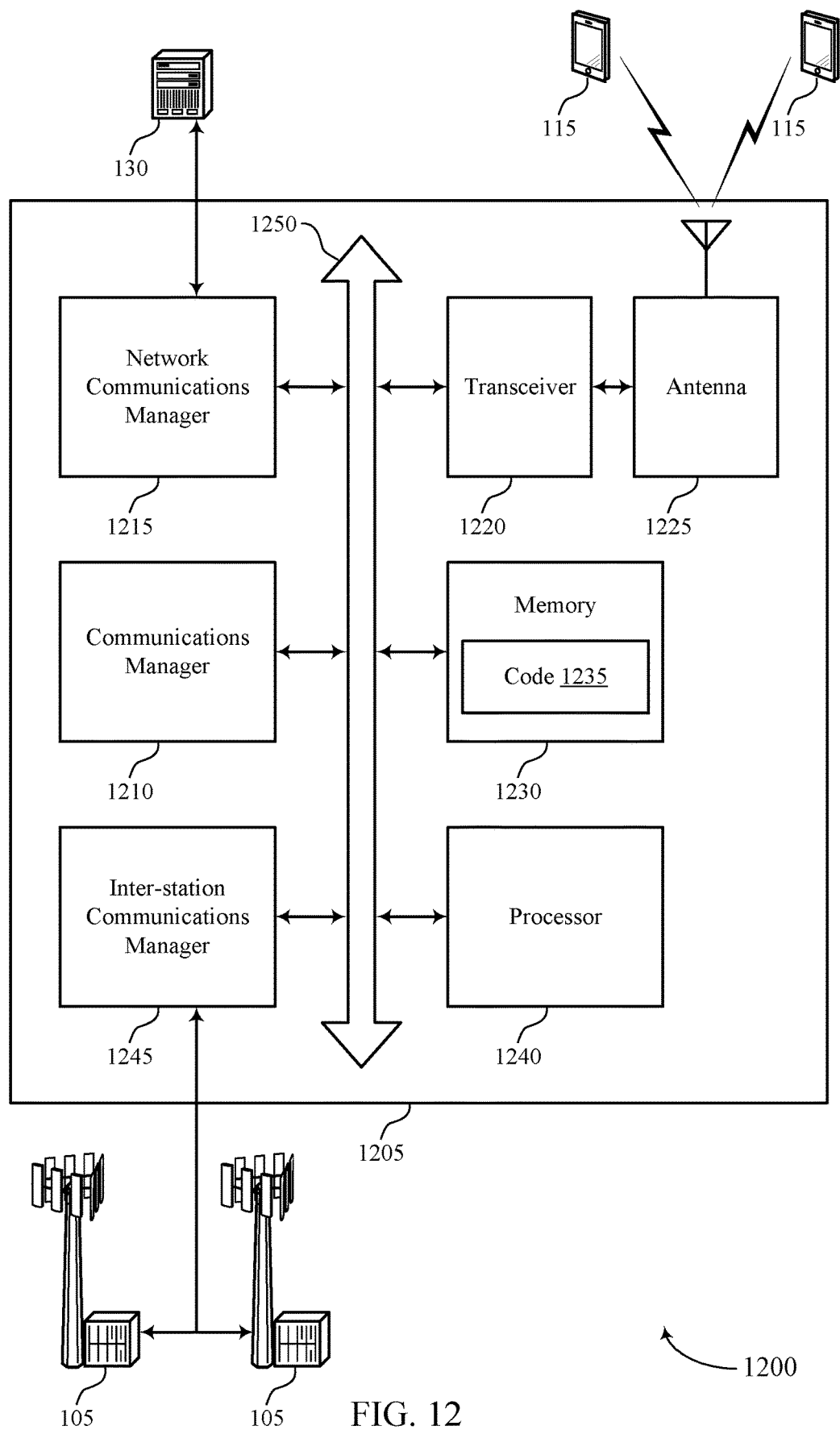
FIG. 12 shows a diagram of a system including a device that supports measurement reporting for multi-port receive beams in accordance with aspects of the present disclosure.

FIG. 12 shows a diagram of a system 1200 including a device 1205 that supports measurement reporting for multi-port receive beams in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, control signaling indicating to generate a measurement report associated with a receive beam at a first port of the UE and a second port of the UE, transmit a reference signal based on the control signaling, and receive, from the UE, the measurement report indicating at least one measurement, a first resource index corresponding to the first port of the UE, and a second resource index corresponding to the second port of the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting measurement reporting for multi-port receive beams).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support PREAMBLE. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
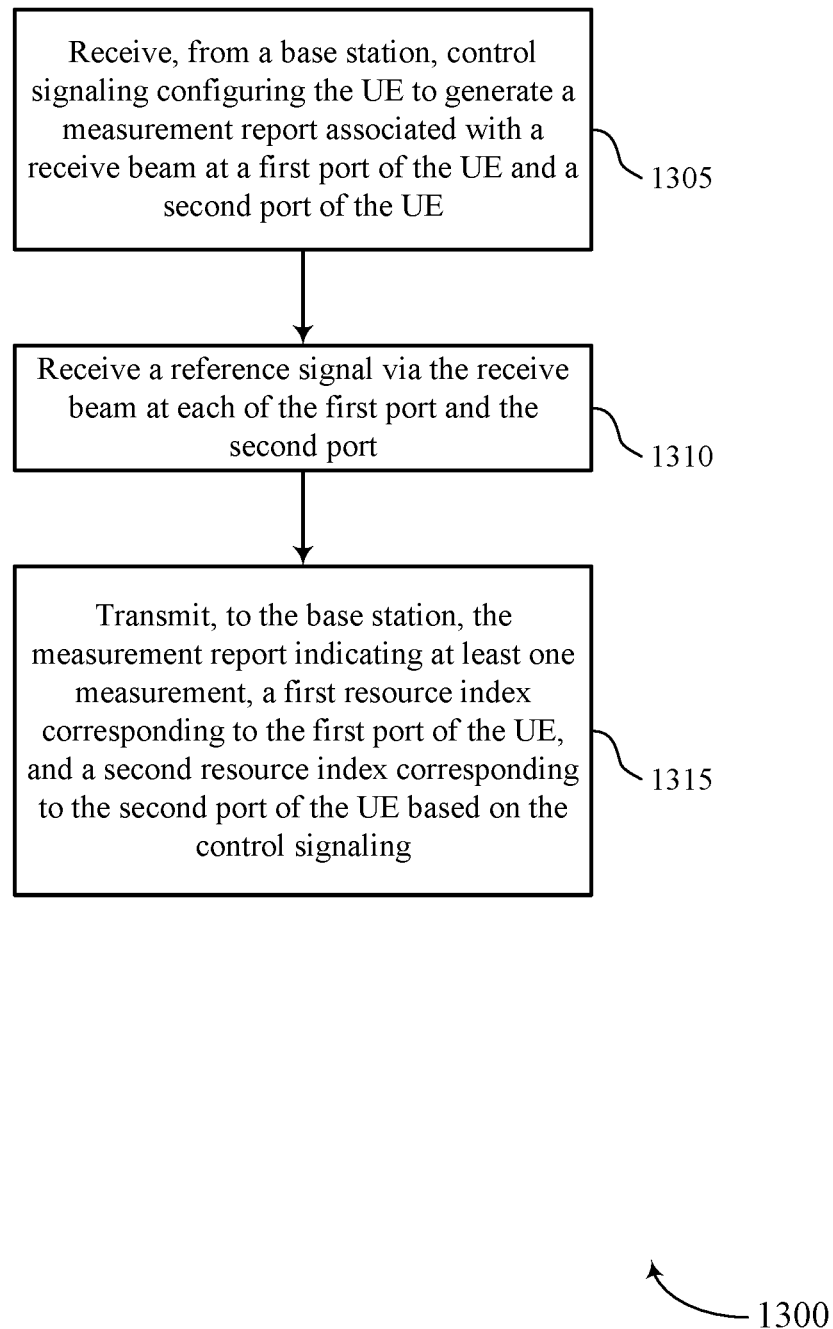
FIGS. 13 through 16 show flowcharts illustrating methods that support measurement reporting for multi-port receive beams in accordance with aspects of the present disclosure.

FIG. 13 shows a flowchart illustrating a method 1300 that supports measurement reporting for multi-port receive beams in accordance with aspects of the present disclosure. The operations of method 1300 may be implemented by a UE 115 or its components as described herein. For example, the operations of method 1300 may be performed by a UE coding manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, control signaling configuring the UE to generate a measurement report associated with a receive beam at a first port of the UE and a second port of the UE. The operations of 1305 may be performed according to the methods described herein. In some examples, aspects of the operations of 1305 may be performed by a control signal receiver as described with reference to FIGS. 5 through 8.

At 1310, the UE may receive a reference signal via the receive beam at each of the first port and the second port. The operations of 1310 may be performed according to the methods described herein. In some examples, aspects of the operations of 1310 may be performed by a reference signal receiver as described with reference to FIGS. 5 through 8.

At 1315, the UE may transmit, to the base station, the measurement report indicating at least one measurement, a first resource index corresponding to the first port of the UE, and a second resource index corresponding to the second port of the UE based on the control signaling. The operations of 1315 may be performed according to the methods described herein. In some examples, aspects of the operations of 1315 may be performed by a measurement report transmitter as described with reference to FIGS. 5 through 8.

Figure 14:
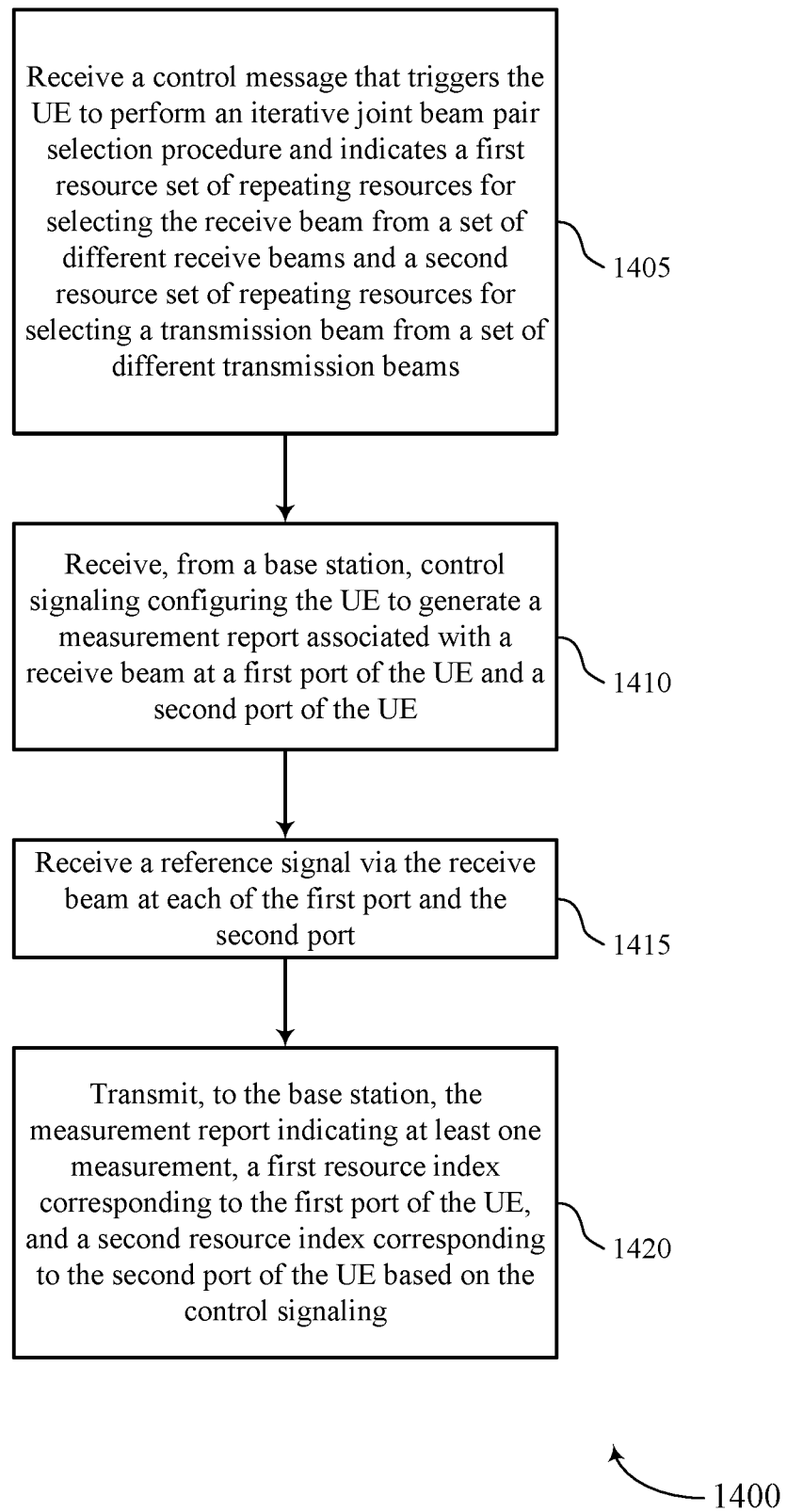

FIG. 14 shows a flowchart illustrating a method 1400 that supports measurement reporting for multi-port receive beams in accordance with aspects of the present disclosure. The operations of method 1400 may be implemented by a UE 115 or its components as described herein. For example, the operations of method 1400 may be performed by a UE coding manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a control message that triggers the UE to perform an iterative joint beam pair selection procedure and indicates a first resource set of repeating resources for selecting the receive beam from a set of different receive beams and a second resource set of repeating resources for selecting a transmission beam from a set of different transmission beams. The operations of 1405 may be performed according to the methods described herein. In some examples, aspects of the operations of 1405 may be performed by a beam pair selection procedure manager as described with reference to FIGS. 5 through 8.

At 1410, the UE may receive, from a base station, control signaling configuring the UE to generate a measurement report associated with a receive beam at a first port of the UE and a second port of the UE. The operations of 1410 may be performed according to the methods described herein. In some examples, aspects of the operations of 1410 may be performed by a control signal receiver as described with reference to FIGS. 5 through 8.

At 1415, the UE may receive a reference signal via the receive beam at each of the first port and the second port. The operations of 1415 may be performed according to the methods described herein. In some examples, aspects of the operations of 1415 may be performed by a reference signal receiver as described with reference to FIGS. 5 through 8.

At 1420, the UE may transmit, to the base station, the measurement report indicating at least one measurement, a first resource index corresponding to the first port of the UE, and a second resource index corresponding to the second port of the UE based on the control signaling. The operations of 1420 may be performed according to the methods described herein. In some examples, aspects of the operations of 1420 may be performed by a measurement report transmitter as described with reference to FIGS. 5 through 8.

Figure 15:
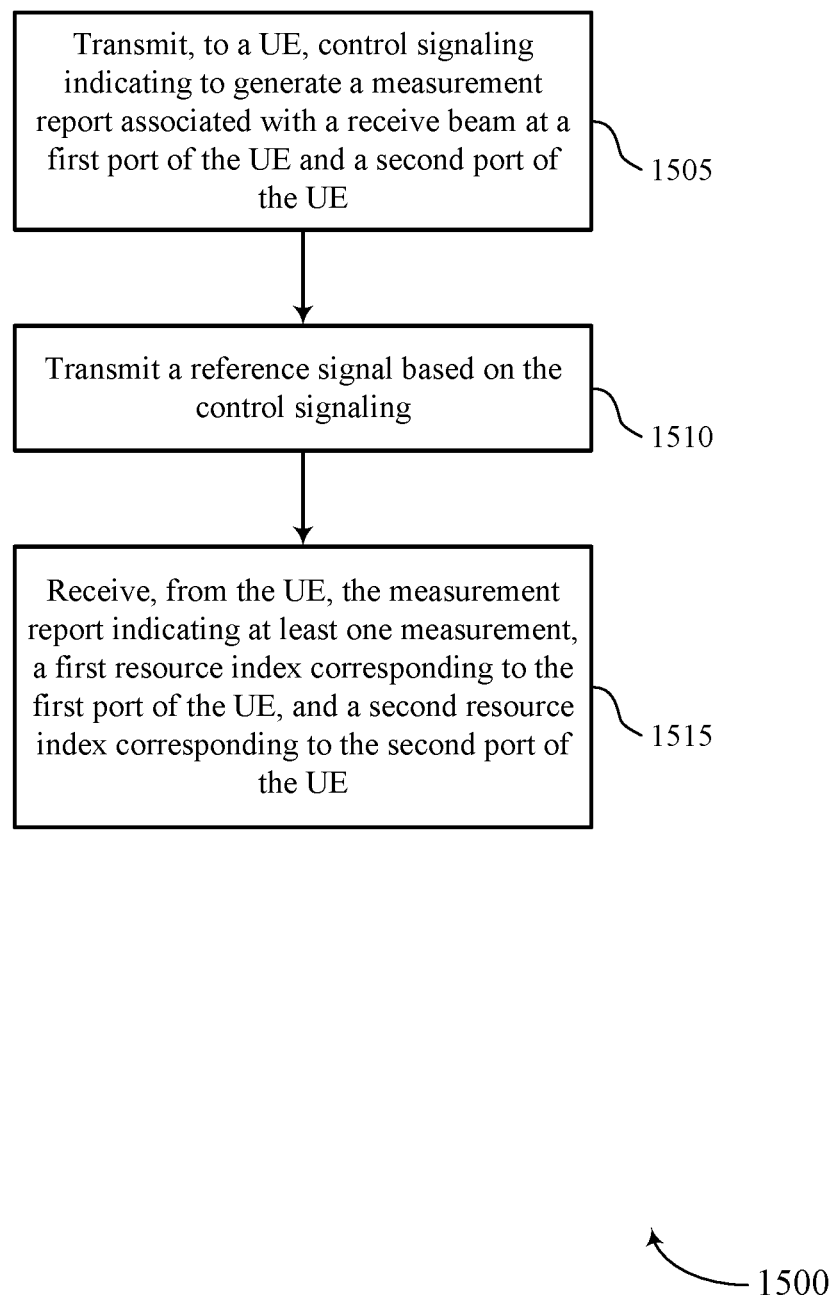

FIG. 15 shows a flowchart illustrating a method 1500 that supports measurement reporting for multi-port receive beams in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE, control signaling indicating to generate a measurement report associated with a receive beam at a first port of the UE and a second port of the UE. The operations of 1505 may be performed according to the methods described herein. In some examples, aspects of the operations of 1505 may be performed by a control signal transmitter as described with reference to FIGS. 9 through 12.

At 1510, the base station may transmit a reference signal based on the control signaling. The operations of 1510 may be performed according to the methods described herein. In some examples, aspects of the operations of 1510 may be performed by a reference signal transmitter as described with reference to FIGS. 9 through 12.

At 1515, the base station may receive, from the UE, the measurement report indicating at least one measurement, a first resource index corresponding to the first port of the UE, and a second resource index corresponding to the second port of the UE. The operations of 1515 may be performed according to the methods described herein. In some examples, aspects of the operations of 1515 may be performed by a measurement report receiver as described with reference to FIGS. 9 through 12.

Figure 16:
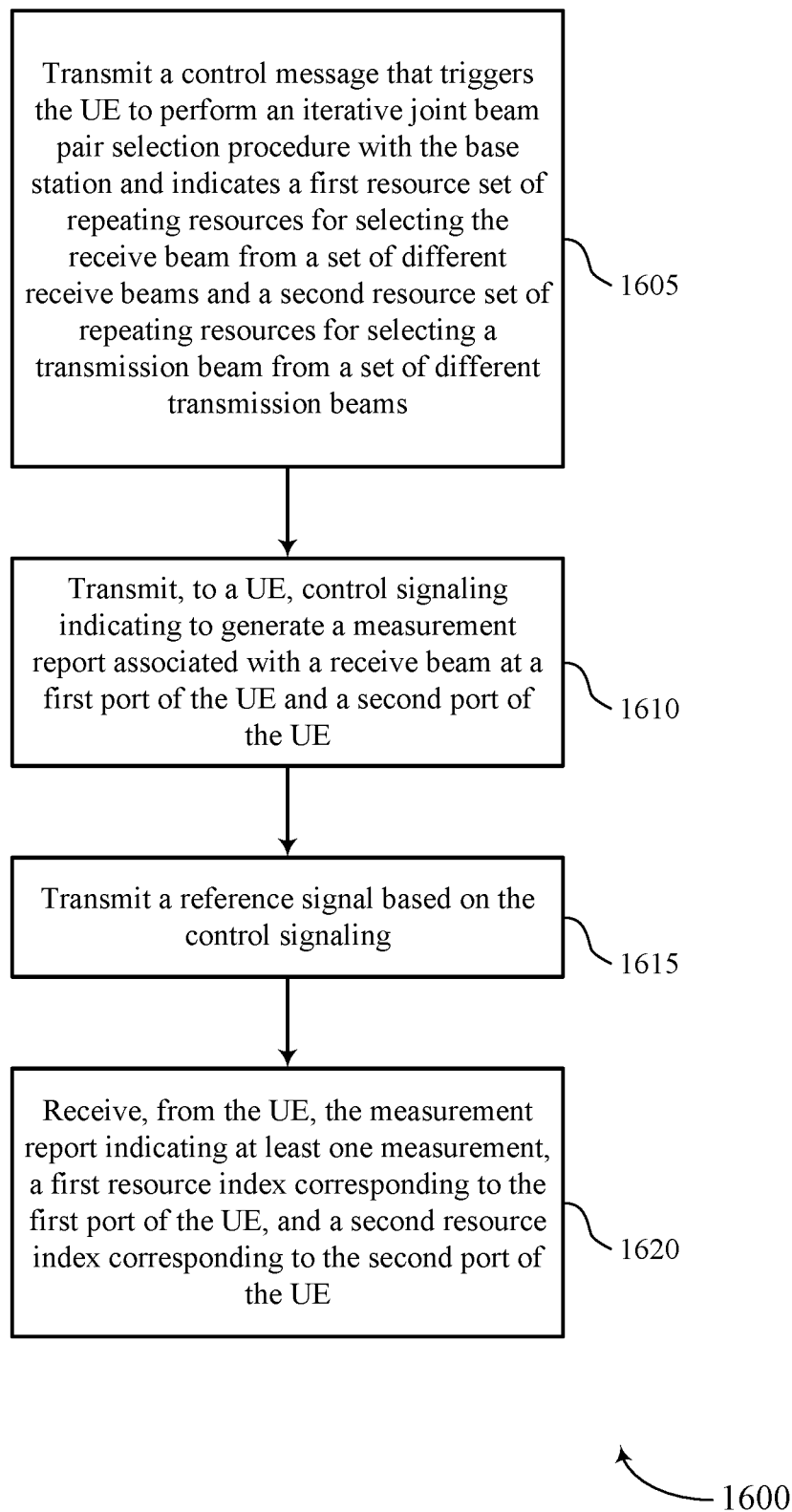

FIG. 16 shows a flowchart illustrating a method 1600 that supports measurement reporting for multi-port receive beams in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit a control message that triggers the UE to perform an iterative joint beam pair selection procedure with the base station and indicates a first resource set of repeating resources for selecting the receive beam from a set of different receive beams and a second resource set of repeating resources for selecting a transmission beam from a set of different transmission beams. The operations of 1605 may be performed according to the methods described herein. In some examples, aspects of the operations of 1605 may be performed by a beam pair selection procedure manager as described with reference to FIGS. 9 through 12.

At 1610, the base station may transmit, to a UE, control signaling indicating to generate a measurement report associated with a receive beam at a first port of the UE and a second port of the UE. The operations of 1610 may be performed according to the methods described herein. In some examples, aspects of the operations of 1610 may be performed by a control signal transmitter as described with reference to FIGS. 9 through 12.

At 1615, the base station may transmit a reference signal based on the control signaling. The operations of 1615 may be performed according to the methods described herein. In some examples, aspects of the operations of 1615 may be performed by a reference signal transmitter as described with reference to FIGS. 9 through 12.

At 1620, the base station may receive, from the UE, the measurement report indicating at least one measurement, a first resource index corresponding to the first port of the UE, and a second resource index corresponding to the second port of the UE. The operations of 1620 may be performed according to the methods described herein. In some examples, aspects of the operations of 1620 may be performed by a measurement report receiver as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, control signaling configuring the UE to generate a measurement report associated with a receive beam at a first port of the UE and a second port of the UE; receiving a reference signal via the receive beam at each of the first port and the second port; and transmitting, to the base station, the measurement report indicating at least one measurement, a first resource index corresponding to the first port of the UE, and a second resource index corresponding to the second port of the UE based at least in part on the control signaling.

Aspect 2: The method of aspect 1, wherein transmitting the measurement report comprises: transmitting at least one measurement comprising a first measurement and a second measurement in the measurement report in a defined order to indicate that the first measurement is associated with one of the first port or the second port and that the second measurement is associated with the other of the first port or the second port.

Aspect 3: The method of any of aspects 1 through 2, further comprising: receiving a downlink transmission via a joint transmission beam generated based at least in part on a first transmission beam corresponding to the first resource index and a second transmission beam corresponding to the second resource index.

Aspect 4: The method of any of aspects 1 through 3, wherein transmitting the measurement report comprises: transmitting the measurement report indicating the at least one measurement that is a first capacity metric or a first mutual information metric for the first port and the second port.

Aspect 5: The method of any of aspects 1 through 4, further comprising: receiving a control message that triggers the UE to perform an iterative joint beam pair selection procedure and indicates a first resource set of repeating resources for selecting the receive beam from a plurality of different receive beams and a second resource set of repeating resources for selecting a transmission beam from a plurality of different transmission beams.

Aspect 6: The method of aspect 5, wherein the first resource set of repeating resources comprise a first plurality of channel measurement resources and a first plurality of interference measurement resources, and the second resource set of repeating resources comprises a second plurality of channel measurement resources that differs from the first plurality of channel measurement resources and a second plurality of interference measurement resources that differs from the first plurality of interference measurement resources.

Aspect 7: The method of aspect 6, wherein performing the iterative joint beam pair selection procedure comprises: selecting the transmission beam from the plurality of different transmission beams based at least in part on monitoring the first plurality of channel measurement resources and the first plurality of interference measurement resources; and selecting the receive beam from the plurality of different receive beams based at least in part on receiving a second reference signal over the plurality of receive beams via the second plurality of channel measurement resources and the second plurality of interference measurement resources.

Aspect 8: The method of any of aspects 5 through 7, further comprising: transmitting a beam selection report indicating the transmission beam, the receive beam, or both, selected using the iterative joint beam pair selection procedure.

Aspect 9: The method of any of aspects 5 through 8, further comprising: monitoring, during the iterative joint beam pair selection procedure, for a first reference signal in each resource over one or more iterations of the first resource set of repeating resources to select the receive beam; and transmitting, during the iterative joint beam pair selection procedure, a second reference signal in each resource over one or more iterations of the second resource set.

Aspect 10: The method of any of aspects 5 through 9, wherein each iteration of the first resource set at least partially overlaps in time with each iteration of the second resource set.

Aspect 11: The method of any of aspects 1 through 10, wherein transmitting the measurement report comprises: transmitting at least one measurement comprising a first measurement that is a first reporting quantity type measured at the first port of the UE and a second measurement that is the first reporting quantity type or a second reporting quantity type measured at the second port of the UE.

Aspect 12: The method of any of aspects 1 through 11, wherein transmitting the measurement report comprises: transmitting the measurement report indicating the first resource index that is a first CRI, and the second resource index that is a second CRI.

Aspect 13: The method of any of aspects 1 through 12, wherein the at least one measurement comprises a first measurement and a second measurement, the method further comprising: measuring the reference signal at the first port to generate the first measurement; and measuring the reference signal at the second port to generate the second measurement.

Aspect 14: The method of any of aspects 1 through 13, wherein transmitting the measurement report comprises: transmitting at least one measurement comprising a first measurement and a second measurement in the measurement report, the measurement report indicating the first measurement and the second measurement that each are one or more of a SINR of the reference signal or a receive power of the reference signal.

Aspect 15: The method of any of aspects 1 through 14, wherein receiving the reference signal comprises: receiving the reference signal that is a CSI-RS.

Aspect 16: The method of any of aspects 1 through 15, wherein receiving the control signaling comprises: receiving radio resource control signaling indicating to generate the measurement report.

Aspect 17: The method of any of aspects 1 through 16, wherein receiving the control signaling comprises: receiving the control signaling indicating a plurality of reference signal resources, wherein the reference signal is received via the plurality of reference signal resources at the first port and the second port.

Aspect 18: The method of aspect 17, wherein transmitting the measurement report comprises: transmitting the measurement report indicating the first resource index corresponding to a first reference signal resource of the plurality of reference signal resources and the second resource index corresponding to a second reference signal resource of the plurality of reference signal resources.

Aspect 19: A method for wireless communication at a base station, comprising: transmitting, to a UE, control signaling indicating to generate a measurement report associated with a receive beam at a first port of the UE and a second port of the UE; transmitting a reference signal based at least in part on the control signaling; and receiving, from the UE, the measurement report indicating at least one measurement, a first resource index corresponding to the first port of the UE, and a second resource index corresponding to the second port of the UE.

Aspect 20: The method of aspect 19, wherein receiving the measurement report comprises: receiving at least one measurement comprising a first measurement and a second measurement in the measurement report in a defined order to indicate that the first measurement is associated with one of the first port or the second port and that the second measurement is associated with the other of the first port or the second port.

Aspect 21: The method of any of aspects 19 through 20, further comprising: transmitting a downlink transmission via a joint transmission beam generated based at least in part on a first transmission beam corresponding to the first resource index and a second transmission beam corresponding to the second resource index.

Aspect 22: The method of any of aspects 19 through 21, wherein receiving the measurement report comprises: receiving the measurement report indicating the at least one measurement that is a first capacity metric or a first mutual information metric for the first port and the second port.

Aspect 23: The method of any of aspects 19 through 22, further comprising: transmitting a control message that triggers the UE to perform an iterative joint beam pair selection procedure with the base station and indicates a first resource set of repeating resources for selecting the receive beam from a plurality of different receive beams and a second resource set of repeating resources for selecting a transmission beam from a plurality of different transmission beams.

Aspect 24: The method of aspect 23, wherein the first resource set of repeating resources comprise a first plurality of channel measurement resources and a first plurality of interference measurement resources, and the second resource set of repeating resources comprises a second plurality of channel measurement resources that differs from the first plurality of channel measurement resources and a second plurality of interference measurement resources that differs from the first plurality of interference measurement resources.

Aspect 25: The method of any of aspects 23 through 24, further comprising: receiving a beam selection report indicating the transmission beam, the receive beam, or both, selected by the UE using the iterative joint beam pair selection procedure.

Aspect 26: The method of any of aspects 23 through 25, further comprising: transmitting, during the iterative joint beam pair selection procedure, a first reference signal in each resource over one or more iterations of the first resource set of repeating resources; and receiving, during the iterative joint beam pair selection procedure, a second reference signal in each resource over one or more iterations of the second resource set.

Aspect 27: The method of any of aspects 23 through 26, wherein each iteration of the first resource set at least partially overlaps in time with each iteration of the second resource set.

Aspect 28: The method of any of aspects 19 through 27, wherein receiving the measurement report comprises: receiving at least one measurement comprising a first measurement that is a first reporting quantity type measured at the first port of the UE and a second measurement that is the first reporting quantity type or a second reporting quantity type measured at the second port of the UE.

Aspect 29: The method of any of aspects 19 through 28, wherein receiving the measurement report comprises: receiving the measurement report indicating the first resource index that is a first CRI, and the second resource index that is a second CRI.

Aspect 30: The method of any of aspects 19 through 29, wherein receiving the measurement report comprises: receiving at least one measurement comprising a first measurement and a second measurement in the measurement report, the measurement report indicating the first measurement and the second measurement that each are one or more of a SINR of the reference signal or a receive power of the reference signal.

Aspect 31: The method of any of aspects 19 through 30, wherein transmitting the reference signal comprises: transmitting the reference signal that is a CSI-RS.

Aspect 32: The method of any of aspects 19 through 31, wherein transmitting the control signaling comprises: transmitting radio resource control signaling indicating to generate the measurement report.

Aspect 33: The method of any of aspects 19 through 32, wherein transmitting the control signaling comprises: transmitting the control signaling indicating a plurality of reference signal resources, wherein the reference signal is transmitted via the plurality of reference signal resources at the first port and the second port.

Aspect 34: The method of aspect 33, wherein receiving the measurement report comprises: receiving the measurement report indicating the first resource index corresponding to a first reference signal resource of the plurality of reference signal resources and the second resource index corresponding to a second reference signal resource of the plurality of reference signal resources.

Aspect 35: An apparatus for wireless communication at a UE, comprising a processor; memory coupled with the processor; and instructions stored in the memory and executable by the processor to cause the apparatus to perform a method of any of aspects 1 through 18.

Aspect 36: An apparatus for wireless communication at a UE, comprising at least one means for performing a method of any of aspects 1 through 18.

Aspect 37: A non-transitory computer-readable medium storing code for wireless communication at a UE, the code comprising instructions executable by a processor to perform a method of any of aspects 1 through 18.

Aspect 38: An apparatus for wireless communication at a base station, comprising a processor; memory coupled with the processor; and instructions stored in the memory and executable by the processor to cause the apparatus to perform a method of any of aspects 19 through 34.

Aspect 39: An apparatus for wireless communication at a base station, comprising at least one means for performing a method of any of aspects 19 through 34.

Aspect 40: A non-transitory computer-readable medium storing code for wireless communication at a base station, the code comprising instructions executable by a processor to perform a method of any of aspects 19 through 34.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a control message that triggers performance of an iterative joint beam pair selection procedure and indicates a first resource set of repeating resources associated with selection of a receive beam from a plurality of different receive beams;
   performing, based at least in part on the control message and via the first resource set of repeating resources, the iterative joint beam pair selection procedure, wherein the iterative joint beam pair selection procedure comprises selection of the receive beam from the plurality of different receive beams;
   receiving, from a network entity, control signaling configuring the UE to generate a measurement report associated with a first port of the UE and a second port of the UE;
   receiving a reference signal via the receive beam at each of the first port and the second port based at least in part on the control signaling and the selection of the receive beam; and
   transmitting, to the network entity, the measurement report indicating at least one measurement, a first resource index corresponding to the first port of the UE, and a second resource index corresponding to the second port of the UE based at least in part on the control signaling.

2. The method of claim 1, wherein transmitting the measurement report comprises:
   transmitting at least one measurement comprising a first measurement and a second measurement in the measurement report in a defined order to indicate that the first measurement is associated with one of the first port or the second port and that the second measurement is associated with the other of the first port or the second port.

3. The method of claim 1, further comprising:
   receiving a downlink transmission via a joint transmission beam generated based at least in part on a first transmission beam corresponding to the first resource index and a second transmission beam corresponding to the second resource index.

4. The method of claim 1, wherein transmitting the measurement report comprises:
   transmitting the measurement report indicating the at least one measurement that is a first capacity metric or a first mutual information metric for the first port and the second port.

5. The method of claim 1,
   wherein the control message indicates a second resource set of repeating resources for selecting a transmission beam from a plurality of different transmission beams.

6. The method of claim 5, wherein the first resource set of repeating resources comprise a first plurality of channel measurement resources and a first plurality of interference measurement resources, and the second resource set of repeating resources comprises a second plurality of channel measurement resources that differs from the first plurality of channel measurement resources and a second plurality of interference measurement resources that differs from the first plurality of interference measurement resources.

7. The method of claim 6, wherein performing the iterative joint beam pair selection procedure comprises:
   selecting the transmission beam from the plurality of different transmission beams based at least in part on monitoring the first plurality of channel measurement resources and the first plurality of interference measurement resources; and
   selecting the receive beam from the plurality of different receive beams based at least in part on receiving a second reference signal over the plurality of different receive beams via the second plurality of channel measurement resources and the second plurality of interference measurement resources.

8. The method of claim 5, further comprising:
   transmitting a beam selection report indicating the transmission beam, the receive beam, or both, selected using the iterative joint beam pair selection procedure.

9. The method of claim 5, further comprising:
   monitoring, during the iterative joint beam pair selection procedure, for a first reference signal in each resource over one or more iterations of the first resource set of repeating resources to select the receive beam; and
   transmitting, during the iterative joint beam pair selection procedure, a second reference signal in each resource over one or more iterations of the second resource set.

10. The method of claim 5, wherein each iteration of the first resource set at least partially overlaps in time with each iteration of the second resource set.

11. The method of claim 1, wherein transmitting the measurement report comprises:
    transmitting at least one measurement comprising a first measurement that is a first reporting quantity type measured at the first port of the UE and a second measurement that is the first reporting quantity type or a second reporting quantity type measured at the second port of the UE.

12. The method of claim 1, wherein transmitting the measurement report comprises:
    transmitting the measurement report indicating the first resource index that is a first channel state information reference signal resource index (CRI), and the second resource index that is a second CRI.

13. The method of claim 1, wherein the at least one measurement comprises a first measurement and a second measurement, the method further comprising:
    measuring the reference signal at the first port to generate the first measurement; and
    measuring the reference signal at the second port to generate the second measurement.

14. The method of claim 1, wherein transmitting the measurement report comprises:
    transmitting at least one measurement comprising a first measurement and a second measurement in the measurement report, the measurement report indicating the first measurement and the second measurement that each are one or more of a signal-to-interference-plus-noise ratio of the reference signal or a receive power of the reference signal.

15. The method of claim 1, wherein receiving the reference signal comprises:
    receiving the reference signal that is a channel state information reference signal.

16. The method of claim 1, wherein receiving the control signaling comprises:

receiving radio resource control signaling indicating to generate the measurement report.

17. The method of claim 1, wherein receiving the control signaling comprises:
receiving the control signaling indicating a plurality of reference signal resources, wherein the reference signal is received via the plurality of reference signal resources at the first port and the second port.

18. The method of claim 17, wherein transmitting the measurement report comprises:
transmitting the measurement report indicating the first resource index corresponding to a first reference signal resource of the plurality of reference signal resources and the second resource index corresponding to a second reference signal resource of the plurality of reference signal resources.

19. A method for wireless communication at a network entity, comprising:
transmitting, to a user equipment (UE), a control message that triggers performance of an iterative joint beam pair selection procedure and indicates a first resource set of repeating resources associated with selection of a receive beam from a plurality of different receive beams;
performing, based at least in part on the control message and via the first resource set of repeating resources, the iterative joint beam pair selection procedure;
transmitting, to the UE, control signaling indicating to generate a measurement report associated with the receive beam at a first port of the UE and a second port of the UE;
transmitting a reference signal based at least in part on the control signaling; and
receiving, from the UE, the measurement report indicating at least one measurement, a first resource index corresponding to the first port of the UE, and a second resource index corresponding to the second port of the UE.

20. The method of claim 19, wherein receiving the measurement report comprises:
receiving at least one measurement comprising a first measurement and a second measurement in the measurement report in a defined order to indicate that the first measurement is associated with one of the first port or the second port and that the second measurement is associated with the other of the first port or the second port.

21. The method of claim 19, further comprising:
transmitting a downlink transmission via a joint transmission beam generated based at least in part on a first transmission beam corresponding to the first resource index and a second transmission beam corresponding to the second resource index.

22. The method of claim 19, wherein receiving the measurement report comprises:
receiving the measurement report indicating the at least one measurement that is a first capacity metric or a first mutual information metric for the first port and the second port.

23. The method of claim 19,
wherein the control message indicates a second resource set of repeating resources for selecting a transmission beam from a plurality of different transmission beams.

24. The method of claim 23, wherein the first resource set of repeating resources comprise a first plurality of channel measurement resources and a first plurality of interference measurement resources, and the second resource set of repeating resources comprises a second plurality of channel measurement resources that differs from the first plurality of channel measurement resources and a second plurality of interference measurement resources that differs from the first plurality of interference measurement resources.

25. The method of claim 23, further comprising:
receiving a beam selection report indicating the transmission beam, the receive beam, or both, selected by the UE using the iterative joint beam pair selection procedure.

26. The method of claim 23, further comprising:
transmitting, during the iterative joint beam pair selection procedure, a first reference signal in each resource over one or more iterations of the first resource set of repeating resources; and
receiving, during the iterative joint beam pair selection procedure, a second reference signal in each resource over one or more iterations of the second resource set.

27. The method of claim 23, wherein each iteration of the first resource set at least partially overlaps in time with each iteration of the second resource set.

28. The method of claim 19, wherein receiving the measurement report comprises:
receiving at least one measurement comprising a first measurement that is a first reporting quantity type measured at the first port of the UE and a second measurement that is the first reporting quantity type or a second reporting quantity type measured at the second port of the UE.

29. A user equipment (UE) for wireless communication, comprising:
one or more memories storing processor-executable code; and
one or more processors coupled with the one or more memories and individually or collectively operable to execute the code to cause the UE to:
receive a control message that triggers performance of an iterative joint beam pair selection procedure and indicates a first resource set of repeating resources associated with selection of a receive beam from a plurality of different receive beams;
perform, based at least in part on the control message and via the first resource set of repeating resources, the iterative joint beam pair selection procedure, wherein the iterative joint beam pair selection procedure comprises selection of the receive beam from the plurality of different receive beams;
receive, from a network entity, control signaling configuring the UE to generate a measurement report associated with a first port of the UE and a second port of the UE;
receive a reference signal via the receive beam at each of the first port and the second port based at least in part on the control signaling and the selection of the receive beam; and
transmit, to the network entity, the measurement report indicating at least one measurement, a first resource index corresponding to the first port of the UE, and a second resource index corresponding to the second port of the UE based at least in part on the control signaling.

30. A network entity for wireless communication, comprising:
one or more memories storing processor-executable code; and one or more processors coupled with the one or more memories and individually or collectively operable to execute the code to cause the network entity to:

transmit, to a user equipment (UE), a control message that triggers performance of an iterative joint beam pair selection procedure and indicates a first resource set of repeating resources associated with selection of a receive beam from a plurality of different receive beams;

perform, based at least in part on the control message and via the first resource set of repeating resources, the iterative joint beam pair selection procedure;

transmit, to the UE, control signaling indicating to generate a measurement report associated with the receive beam at a first port of the UE and a second port of the UE;

transmit a reference signal based at least in part on the control signaling; and receive, from the UE, the measurement report indicating at least one measurement, a first resource index corresponding to the first port of the UE, and a second resource index corresponding to the second port of the UE.

* * * * *